US009769427B2

(12) United States Patent
Taniguchi et al.

(10) Patent No.: US 9,769,427 B2
(45) Date of Patent: *Sep. 19, 2017

(54) CONTENT DELIVERY SYSTEM

(75) Inventors: Kunihiro Taniguchi, Tokyo (JP);
Kazushige Ishikawa, Tokyo (JP);
Kazuo Asami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 168 days.

This patent is subject to a terminal disclaimer.

(21) Appl. No.: 13/129,756

(22) PCT Filed: Nov. 17, 2009

(86) PCT No.: PCT/JP2009/006140
§ 371 (c)(1),
(2), (4) Date: May 17, 2011

(87) PCT Pub. No.: WO2010/058549
PCT Pub. Date: May 27, 2010

(65) Prior Publication Data
US 2011/0225270 A1    Sep. 15, 2011

(30) Foreign Application Priority Data

Nov. 18, 2008  (JP) ................................. 2008-294270

(51) Int. Cl.
*H04N 7/16*         (2011.01)
*G06Q 30/02*        (2012.01)
(Continued)

(52) U.S. Cl.
CPC ............. *H04N 7/165* (2013.01); *G06Q 30/02* (2013.01); *H04N 21/25808* (2013.01);
(Continued)

(58) Field of Classification Search
CPC ............... H04L 29/08072; H04L 29/06; H04L 29/0809; H04L 29/08981; H04L 29/08117
(Continued)

(56) References Cited

U.S. PATENT DOCUMENTS 8,458,184 B2 *  6/2013  Dorogusker ....... G06Q 30/0241
                                                707/740
2001/0025377 A1 *  9/2001  Hinderks ............ H04L 12/1859
                                                725/109

(Continued)

FOREIGN PATENT DOCUMENTS

JP    2004-140584 A    5/2004
JP    2005-012655 A    1/2005
(Continued)

OTHER PUBLICATIONS

European search report for EP09827330.3 dated Oct. 24, 2012.
(Continued)

*Primary Examiner* — Mark Rinehart
*Assistant Examiner* — Natali N Pascual Peguero

(57) ABSTRACT

The system (1) includes an application server system (AP system) (4) and a connection control system (3). Based on equipment specification information transmitted by user equipment (2), the connection control system (3) establishes connection between the AP system (4) and the user equipment (2). The AP system (4) receives a content delivery request transmitted by the user equipment (2) and containing information for identifying main content. The AP system (4) selects advertisement content based on advertisement selection information. The AP system (4) transmits information for specifying the selected advertisement content to the user equipment (2).

36 Claims, 20 Drawing Sheets

(51) Int. Cl.
  *H04N 21/258* (2011.01)
  *H04N 21/2668* (2011.01)
  *H04N 21/482* (2011.01)
  *H04N 21/81* (2011.01)

(52) U.S. Cl.
  CPC ....... *H04N 21/2668* (2013.01); *H04N 21/482* (2013.01); *H04N 21/812* (2013.01)

(58) Field of Classification Search
  USPC ................................................ 709/217, 219
  See application file for complete search history.

(56) References Cited

U.S. PATENT DOCUMENTS

| 2002/0033844 | A1  | 3/2002 | Levy et al. |
| 2003/0105669 | A1* | 6/2003 | Tsuchiya ........................ 705/14 |
| 2007/0088838 | A1  | 4/2007 | Levkovitz et al. |
| 2007/0186003 | A1  | 8/2007 | Foster et al. |
| 2007/0223523 | A1* | 9/2007 | Montpetit et al. ............ 370/465 |
| 2008/0256216 | A1* | 10/2008 | Aarts ........................... 709/217 |

FOREIGN PATENT DOCUMENTS

| JP | 2006191594 A | 7/2006 |
| JP | 2007-528680 A | 10/2007 |
| JP | 2008022298 A | 1/2008 |
| JP | 2008153896 A | 7/2008 |
| WO | 2007105568 A | 9/2007 |

OTHER PUBLICATIONS

International Search Report for PCT/JP2009/006140 mailed Feb. 16, 2010.
Japanese Office Action for JP Application No. 2010-539136 mailed on Nov. 19, 2013 with English Translation.
Japanese Office Action for JP Application No. 2014-087402 mailed on Mar. 31, 2015.

* cited by examiner

Fig.3

| ADVERTISEMENT ATTRIBUTE INFORMATION | PRIORITY INFORMATION |
|---|---|
| CAR | 1 |
| REAL ESTATE | 2 |
| TRAVEL | 4 |
| INSURANCE | 5 |
| CELL-PHONE | 3 |
| COFFEE | 3 |
| GADGET | 4 |
| ⋮ | ⋮ |

Fig.7

```
INVITE sip:bob@biloxi.com SIP/2.0
Via: SIP/2.0/UDP
pc33.atlanta.com;branch=z9hG4bKnashds8
Max-Forwards: 70
To: Bob <sip:bob@biloxi.com>
From: Alice <sip:alice@atlanta.com>;tag=1928301774
Call-ID: a84b4c76e66710
CSeq: 314159 INVITE
X-video-sequence: content1;0;300,adv1;0;30,content1;301;6
00,adv2;0;30,content1;601;900
Contact: <sip:alice@pc33.atlanta.com>
Content-Type: application/sdp
Content-Length: 142 v=0
o=jdoe 2890844526 2890842807 IN IP4 10.47.16.5
s=SDP Seminar
i=A Seminar on the session description protocol
e=j.doe@example.com (Jane Doe)
c=IN IP4 224.2.17.12/127
t=2873397496 2873404696
a=recvonly
m=application 9 TCP/TLS iptv_rtsp
a=setup:active
a=connection:new
c=IN IP4 10.10.10.10
m=audio 49170 RTP/AVP 0
c=IN IP4 10.10.10.10
b=AS:150000
a=recvonly
m=video 51372 RTP/AVP 99
c=IN IP4 10.10.10.10
b=AS:150000
a=recvonly
a=rtpmap:99 h263-1998/90000
```

PL — (X-video-sequence lines)
HE — header
BD — body

Fig.8

PL {
```
INVITE sip:content1@atlanta.com?seq=adv1+0+30+conten
t1+0+300+adv2+0+30+content1+301+600+adv3+0+30 SIP/
2.0
Via: SIP/2.0/UDP
pc33.atlanta.com;branch=z9hG4bKnashds8
Max-Forwards: 70
To: Bob <sip:bob@biloxi.com>
From: Alice <sip:alice@atlanta.com>;tag=1928301774
Call-ID: a84b4c76e66710
CSeq: 314159 INVITE
Contact: <sip:alice@pc33.atlanta.com>
Content-Type: application/sdp
Content-Length: 142 v=0
o=jdoe 2890844526 2890842807 IN IP4 10.47.16.5
s=SDP Seminar
i=A Seminar on the session description protocol
e=j.doe@example.com (Jane Doe)
c=IN IP4 224.2.17.12/127
t=2873397496 2873404696
a=recvonly
m=application 9 TCP/TLS iptv_rtsp
a=setup:active
a=connection:new
c=IN IP4 10.10.10.10
m=audio 49170 RTP/AVP 0
c=IN IP4 10.10.10.10
b=AS:150000
a=recvonly
m=video 51372 RTP/AVP 99
c=IN IP4 10.10.10.10
b=AS:150000
a=recvonly
a=rtpmap:99 h263-1998/90000
```

Fig.9

```
INVITE sip:bob@biloxi.com SIP/2.0
Via: SIP/2.0/UDP
pc33.atlanta.com;branch=z9hG4bKnashds8
Max-Forwards: 70
To: Bob <sip:bob@biloxi.com>
From: Alice <sip:alice@atlanta.com>;tag=1928301774
Call-ID: a84b4c76e66710
CSeq: 314159 INVITE
Contact: <sip:alice@pc33.atlanta.com>
Content-Type: application/sdp
Content-Length: 142
```
— HE

```
v=0
o=jdoe 2890844526 2890842807 IN IP4 10.47.16.5
s=SDP Seminar
i=A Seminar on the session description protocol
a=videosequence:adv1;0;30,content1;0;300,adv2;0;30,content1;301;600,adv3;0;30
e=j.doe@example.com (Jane Doe)
c=IN IP4 224.2.17.12/127
t=2873397496 2873404696
a=recvonly
m=application 9 TCP/TLS iptv_rtsp
a=setup:active
a=connection:new
c=IN IP4 10.10.10.10
m=audio 49170 RTP/AVP 0
c=IN IP4 10.10.10.10
b=AS:150000
a=recvonly
m=video 51372 RTP/AVP 99
c=IN IP4 10.10.10.10
b=AS:150000
a=recvonly
a=rtpmap:99 h263-1998/90000
```
PL (left brace for payload section) — BD (right brace for body section)

Fig.10

```
INVITE sip:bob@biloxi.com SIP/2.0
Via: SIP/2.0/UDP
pc33.atlanta.com;branch=z9hG4bKnashds8
Max-Forwards: 70
To: Bob <sip:bob@biloxi.com>
From: Alice <sip:alice@atlanta.com>;tag=1928301774
Call-ID: a84b4c76e66710
CSeq: 314159 INVITE
Contact: <sip:alice@pc33.atlanta.com>
Content-Type: multipart/mixed; boundary="boundary 0000"
```
⎬ HE

```
--boundary 0000
Content-Type: application/sdp
Content-Length: 142 v=0
o=jdoe 2890844526 2890842807 IN IP4 10.47.16.5
s=SDP Seminar
i=A Seminar on the session description protocol
e=j.doe@example.com (Jane Doe)
c=IN IP4 224.2.17.12/127
t=2873397496 2873404696
m=application 9 TCP/TLS iptv_rtsp
a=setup:active
a=connection:new
c=IN IP4 10.10.10.10
m=audio 49170 RTP/AVP 0
c=IN IP4 10.10.10.10
b=AS:150000
a=recvonly
m=video 51372 RTP/AVP 99
c=IN IP4 10.10.10.10
b=AS:150000
a=recvonly
a=rtpmap:99 h263-1998/90000

--boundary 0000
```
⎬ BD1

```
Content-Type: plain/text
Content-Length: 142 adv1;0;30
content1;0;300      } PL
adv2;0;30
content1;301;600
adv3;0;30

--boundary 0000
```
⎬ BD2

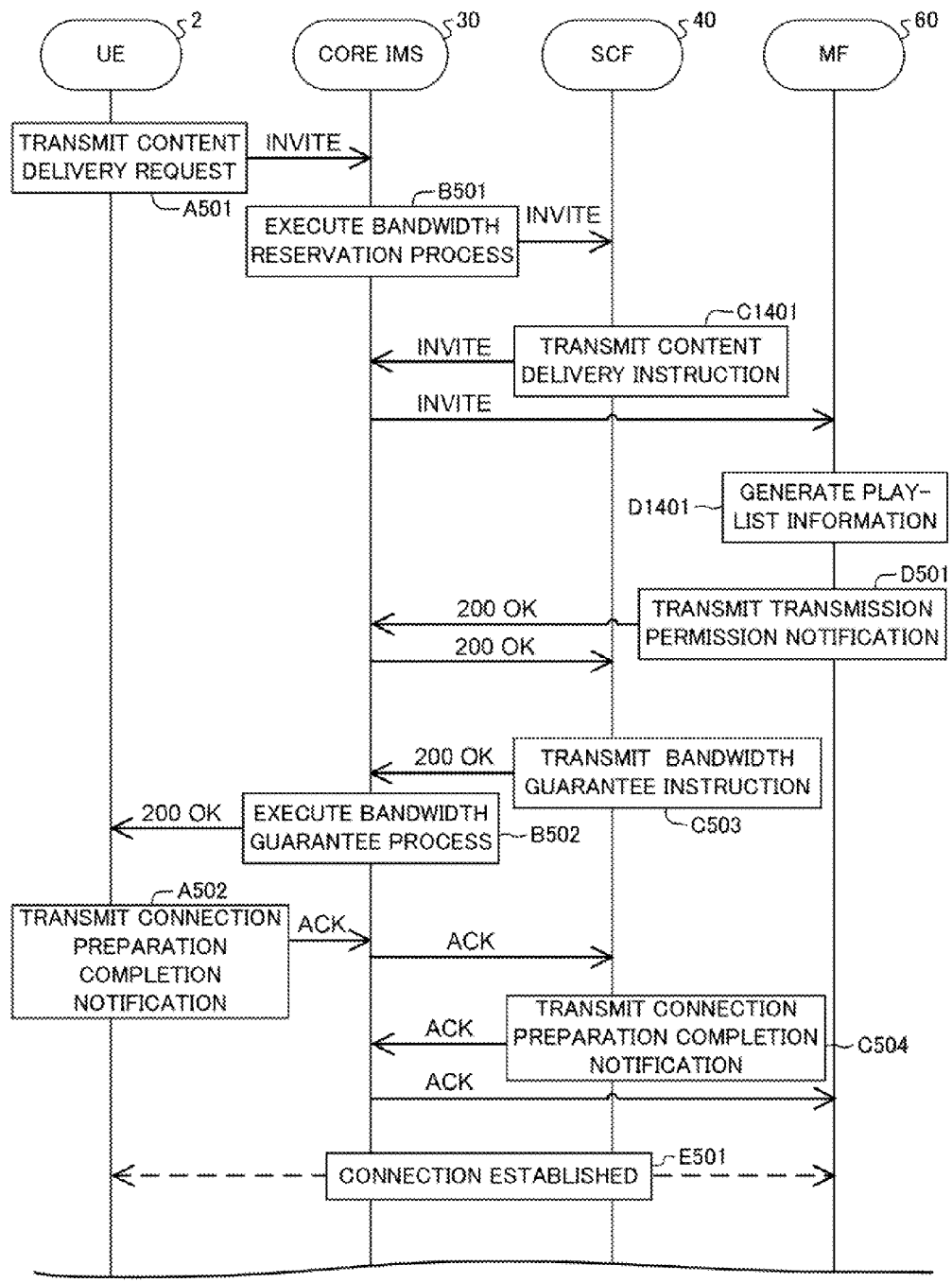

Fig.16

```
INVITE sip:bob@biloxi.com SIP/2.0
Via: SIP/2.0/UDP
pc33.atlanta.com;branch=z9hG4bKnashds8
Max-Forwards: 70
To: Bob <sip:bob@biloxi.com>
From: Alice <sip:alice@atlanta.com>;tag=1928301774
Call-ID: a84b4c76e66710
CSeq: 314159 INVITE
X-user-favorite: car;1,real estate;2,travel;3,insurance;5,mobil
e phone;3,coffee;3,gadget;4
X-content-favorite: car;3,real estate;1,travel;4,insurance;5,mo
bile phone;2,coffee;1,gadget;3
Contact: <sip:alice@pc33.atlanta.com>
Content-Type: application/sdp
Content-Length: 142 v=0
o=jdoe 2890844526 2890842807 IN IP4 10.47.16.5
s=SDP Seminar
i=A Seminar on the session description protocol
e=j.doe@example.com (Jane Doe)
c=IN IP4 224.2.17.12/127
t=2873397496 2873404696
a=recvonly
m=application 9 TCP/TLS iptv_rtsp
a=setup:active
a=connection:new
c=IN IP4 10.10.10.10
m=audio 49170 RTP/AVP 0
c=IN IP4 10.10.10.10
b=AS:150000
a=recvonly
m=video 51372 RTP/AVP 99
c=IN IP4 10.10.10.10
b=AS:150000
a=recvonly
a=rtpmap:99 h263-1998/90000
```

Labels: UI (X-user-favorite lines), CI (X-content-favorite lines), HE (header portion), BD (body portion)

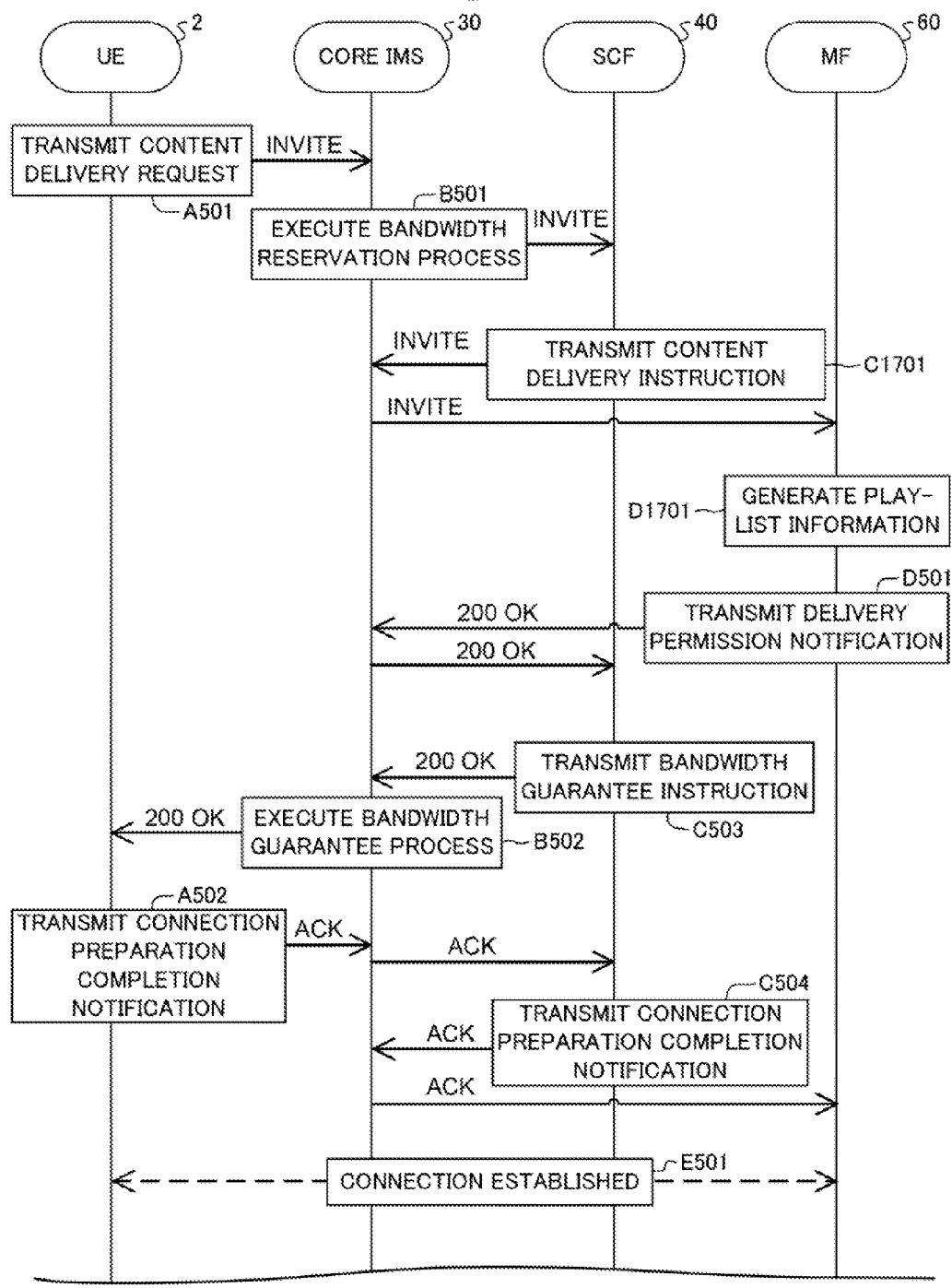

Fig.19

```
INVITE sip:bob@biloxi.com SIP/2.0
Via: SIP/2.0/UDP
pc33.atlanta.com;branch=z9hG4bKnashds8
Max-Forwards: 70
To: Bob <sip:bob@biloxi.com>
From: Alice <sip:alice@atlanta.com>;tag=1928301774
Call-ID: a84b4c76e66710
CSeq: 314159 INVITE
X-video-advertisement: adv1,adv2,adv3
Contact: <sip:alice@pc33.atlanta.com>
Content-Type: application/sdp
Content-Length: 142 v=0
o=jdoe 2890844526 2890842807 IN IP4 10.47.16.5
s=SDP Seminar
i=A Seminar on the session description protocol
e=j.doe@example.com (Jane Doe)
c=IN IP4 224.2.17.12/127
t=2873397496 2873404696
a=recvonly
m=application 9 TCP/TLS iptv_rtsp
a=setup:active
a=connection:new
c=IN IP4 10.10.10.10
m=audio 49170 RTP/AVP 0
c=IN IP4 10.10.10.10
b=AS:150000
a=recvonly
m=video 51372 RTP/AVP 99
c=IN IP4 10.10.10.10
b=AS:150000
a=recvonly
a=rtpmap:99 h263-1998/90000
```

AD — (X-video-advertisement line)
HE — (header block)
BD — (body block)

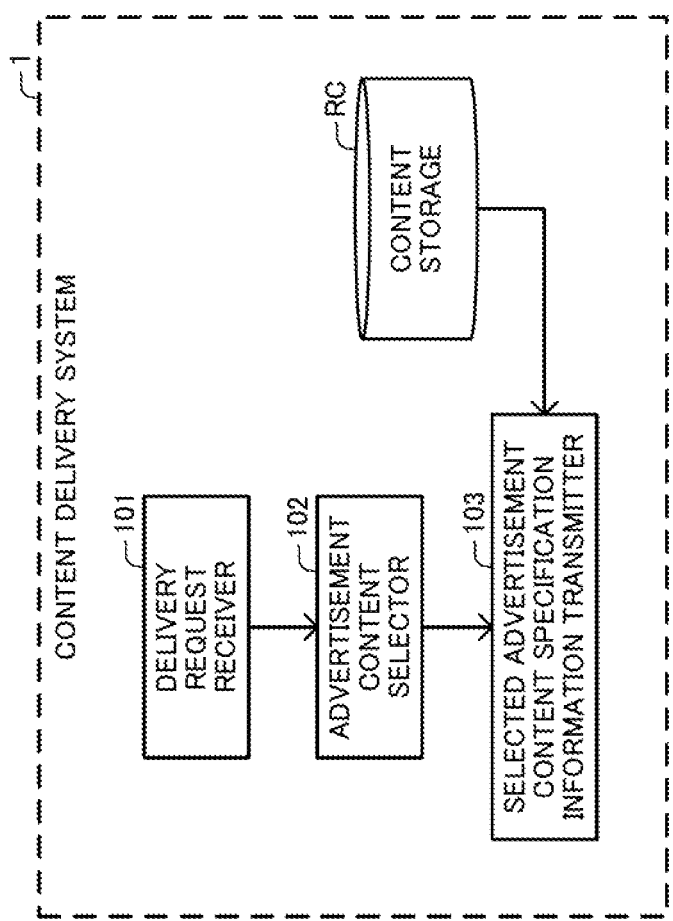

CONTENT DELIVERY SYSTEM

TECHNICAL FIELD

The present invention relates to a content delivery system transmitting content data representing content to user equipment.

BACKGROUND ART

A content delivery system is known including a content transmitter, a content receiver, and a connection controller (SIP (Session Initiation Protocol) server).

In this content delivery system, the content receiver transmits a content delivery request to the connection controller. In response to the content delivery request, the connection controller transmits a content delivery instruction to the content transmitter, while establishing a connection between the content transmitter and the content receiver. Further, the content delivery system executes a process to reserve a communication bandwidth of a communication channel between the content transmitter and the content receiver. Once the connection is established by the connection controller, the content transmitter transmits prestored content data to the content receiver.

[Patent Document 1] JP 2008-153896A

SUMMARY

In the content delivery system described above, the content transmitter transmits prestored content data in response to a request from the content receiver.

Therefore, it is considered preferable that, in order to cause a user of the content receiver to view viewing content in which advertisement content is inserted into main content which the user desires to view (user's desired content), the content delivery system should be configured such that viewing content data representing the viewing content is previously stored in the content transmitter.

However, even if the content delivery system is configured in this manner, the content delivery system cannot change the advertisement content inserted into the main content according to the user's desired content and/or the user who views the content. This means that the aforementioned content delivery system is not able to cause a user to view the user's desired content and/or advertisement content selected according to the user.

It is therefore an object of the present invention to provide a content delivery system capable of solving the problem that it is impossible to cause a user to view the user's desired content and/or advertisement content selected according to the user.

In order to achieve the object as described above, an aspect of the present invention provides a content delivery system including an application server system and a connection control system. The connection control system is configured to receive equipment specification information transmitted by user equipment and establish connection between the application server system and the user equipment based on the received equipment specification information. The application server system includes: content storage means for storing advertisement content data representing advertisement content and main content data representing main content; delivery request reception means for receiving, via the connection control system, a content delivery request transmitted by the user equipment and containing main content identification information for identifying the main content; advertisement content selection means for selecting the stored advertisement content data based on advertisement selection information containing advertisement attribute information representing an attribute of the advertisement content; and selected advertisement content specification information transmission means for transmitting selected advertisement content specification information for specifying the selected advertisement content data, via the connection control system to the user equipment which has transmitted the content delivery request.

Another aspect of the present invention provides a content delivery system also including an application server system and a connection control system. The connection control system includes a core EMS (Internet Protocol Multimedia Subsystem) part which is configured to receive equipment specification information transmitted by user equipment and establish connection between the application server system and the user equipment based on the received equipment specification information. The application server system includes: a media functions part for transmitting content data representing content to the user equipment with which the connection is established by the core IMS part; a service control functions part for controlling a service provided by the media functions part; and a user profile server functions part for storing profile information of a user of the user equipment. The media functions part includes content storage means for storing advertisement content data representing advertisement content and main content data representing main content. The service control functions part includes: delivery request reception means for receiving a content delivery request containing main content identification information for identifying the main content and transmitted by the user equipment, via the core IMS part; advertisement content selection means for selecting the stored advertisement content data based on advertisement selection information containing advertisement attribute information representing an attribute of the advertisement content and preliminarily stored by the user profile server functions part, the service control functions part or the connection control system; and selected advertisement content specification information transmission means for transmitting, via the core IMS part, selected advertisement content specification information for specifying the selected advertisement content data to the user equipment which has transmitted the content delivery request.

Another aspect of the present invention provides a content delivery method comprising: receiving equipment specification information transmitted by user equipment and establishing connection between an application server system and the user equipment based on the received equipment specification information, by a connection control system; receiving, via the connection control system, a content delivery request containing main content identification information for identifying main content and transmitted by the user equipment, by the application server system; selecting advertisement content data stored in a storing device for storing advertisement content data representing advertisement content and main content data representing main content, based on advertisement selection information containing advertisement attribute information representing an attribute of advertisement content; and transmitting selected advertisement content specification information specifying the selected advertisement content data via the connection control system to the user equipment which has transmitted the content delivery request, by the application server system.

Still another aspect of the present invention provides a computer program comprising instructions for causing a service control server to realize: delivery request reception means for receiving a content delivery request containing main content identification information for identifying main content and transmitted by user equipment, via a connection control system establishing connection between a media server and the user equipment; advertisement content selection means for selecting advertisement content data preliminarily stored in a storing device based on advertisement selection information containing advertisement attribute information representing an attribute of advertisement content; and selected advertisement content specification information transmission means for transmitting selected advertisement content specification information specifying the selected advertisement content data, via the connection control system to the user equipment which has transmitted the content delivery request.

Still another aspect of the present invention provides a computer program comprising instructions to cause user equipment to realize: selected advertisement content specification information reception means for receiving selected advertisement content specification information which is information for specifying selected advertisement content data and transmitted by an application server system, via a connection control system establishing connection between the application server system and the user equipment; and content viewing request transmission means for transmitting, to the application server system, a main content viewing request containing main content identification information for identifying main content and an advertisement content viewing request containing the received selected advertisement content specification information, when connection with the application server system is established by the connection control system.

The present invention configured as described above is capable of allowing a user to view the user's desired content and/or advertisement content selected according to the user.

BRIEF DESCRIPTION OF DRAWINGS

FIG. 3 is a table illustrating user basic information stored in the user information management server shown in FIG. 1;

FIG. 7 is a diagram showing an INVITE message containing a content delivery instruction;

FIG. 8 is a diagram showing an INVITE message containing a content delivery instruction according to a modification of the first embodiment;

FIG. 9 is a diagram showing an INVITE message containing a content delivery instruction according to a modification of the first embodiment;

FIG. 10 is a diagram showing an INVITE message containing a content delivery instruction according to a modification of the first embodiment;

FIG. 15 is a sequence diagram showing operation performed by the content delivery system according to the second embodiment of the invention when transmitting viewing content data to the user equipment in response to an input of the user of the user equipment;

FIG. 16 is a diagram showing an INVITE message containing a content delivery instruction according to the second embodiment of the present invention;

FIG. 18 is a sequence diagram illustrating operation performed by the content delivery system according to the third embodiment of the present invention when transmitting viewing content data to the user equipment in response to an input of the user of the user equipment;

FIG. 19 is a diagram showing an INVITE message containing a content delivery instruction according to the third embodiment of the present invention; and FIG. 20 is a block diagram schematically illustrating functions of a content delivery system according to a fourth embodiment of the present invention.

EXEMPLARY EMBODIMENTS

Exemplary preferred embodiments of a content delivery system, a content delivery method, and a computer program according to the present invention will be described with reference to FIGS. 1 to 20.

First Embodiment (Configuration)

Figure 1:
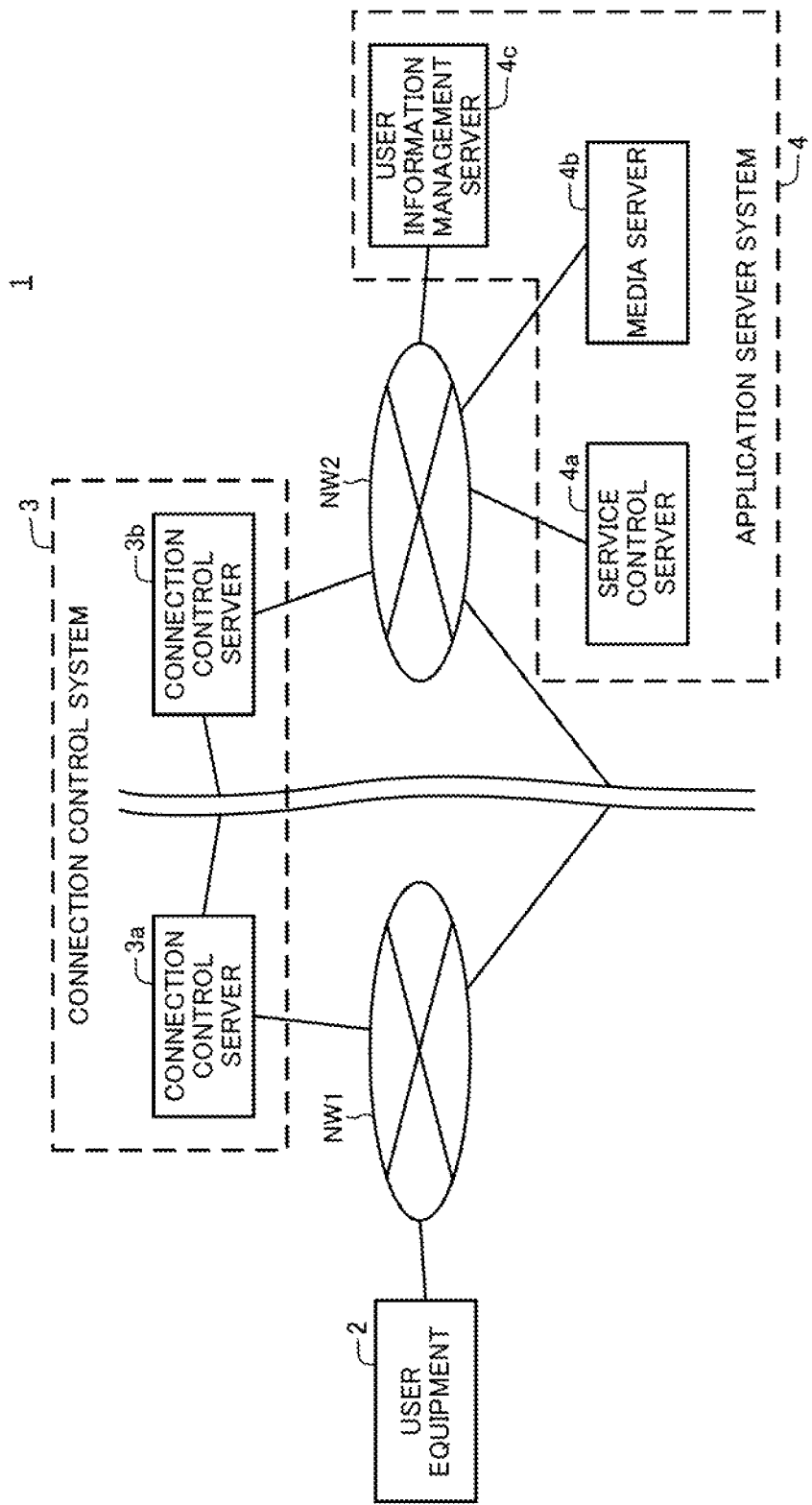
FIG. 1 is a diagram illustrating a schematic configuration of a content delivery system according to a first embodiment of the present invention.

As illustrated in FIG. 1, a content delivery system 1 according to a first embodiment is a Video-on-Demand system. Alternatively, the content delivery system 1 may be an IPTV (Internet Protocol Television) system for broadcasting content.

The content delivery system 1 includes a connection control system 3 and an application server system 4. The connection control system 3 includes a plurality of servers including a connection control server 3*a* and a connection control server 3*b*. The application server system 4 includes a plurality of servers including a service control server 4a, a media server 4b, and a user information management server 4c.

The connection control server 3a is communicably connected to user equipment (UE) 2 through user communication lines NW1 forming an IP (Internet Protocol) network. The connection control server 3b and the application server system 4 are communicably connected to each other through service provider communication lines NW2 forming the IP network.

The user equipment 2 has a set-top box and a remote controller (both not shown). The set-top box is connected to a television receiver (not shown). The set-top box receives content data representing content transmitted from the media server 4b (here, the content is a video consisting of sound and images), and outputs the content to the television receiver by converting the received content data.

The remote controller has a plurality of buttons (button switches). When a button is pressed by a user, the remote controller transmits an infrared signal corresponding to the pressed button to the set-top box. The set-top box accepts information input by the user by receiving the infrared signal from the remote controller.

The user equipment 2 stores equipment specification information for specifying the equipment (local terminal) in a memory serving as a storing device.

The connection control server 3a, the connection control server 3b, the service control server 4a, the media server 4b, and the user information management server 4c (servers 3a to 4c) each have a central processing unit (CPU) (not shown), and a storing device (memory and hard disk drive (HDD)) (not shown). Each of the servers 3a to 4c is configured to realize functions described below by the CPU executing a program stored in the storing device.

The connection control server 3a and the connection control server 3b are configured to control connection between a plurality of devices by exchanging (receiving and transmitting) a SIP message (message according to Session Initiation Protocol). In other words, each of the connection control server 3a and the connection control server 3b is a SIP server.

The connection control system 3 is configured to establish, upon receiving a SIP message containing equipment specification information transmitted by the user equipment 2, connection (session) between the application server system 4 and the user equipment 2 based on the equipment specification information contained in the received SIP message.

The service control server 4a controls a service provided by the media server 4b (service to transmit content data). The media server 4b transmits content data representing content to the user equipment 2 with which the connection is established by the connection control system 3. The user information management server 4c preliminarily stores profile information of the user of the user equipment 2, and transmits the stored profile information to the service control server 4a.

(Functions)

Figure 2:
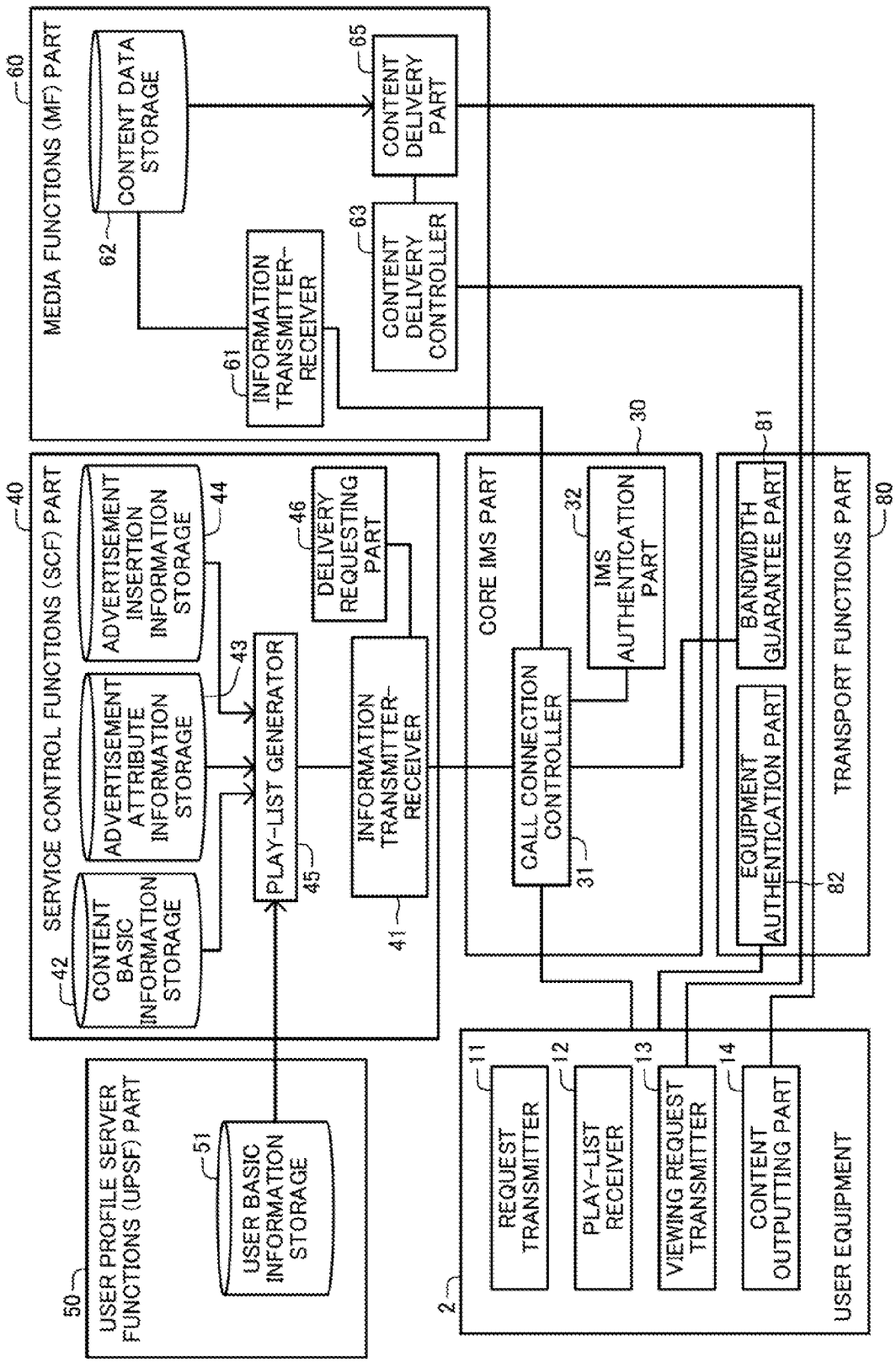
FIG. 2 is a block diagram schematically illustrating functions of the content delivery system shown in FIG. 1.

FIG. 2 is a block diagram illustrating functions of the content delivery system 1 configured as described above.

(Functions of User Equipment)

Functions of the user equipment 2 include a request transmitter 11, a play-list receiver (selected advertisement content specification information reception means) 12, a viewing request transmitter (content viewing request transmission means) 13, and a content outputting part (content outputting means) 14.

The request transmitter 11 transmits, to the connection control server 3a, a SIP message as an equipment authentication request containing the stored equipment specification information, when the state of a power switch of the user equipment 2 is set to ON state (when power is supplied).

The request transmitter 11 receives a SIP message containing equipment authentication success information from the connection control system 3. The equipment authentication success information is information containing equipment address information representing a position of the equipment in the IP network, and indicating that the user equipment 2 located at the position represented by the equipment address information is authenticated to be valid equipment.

Further, the request transmitter 11 transmits, to the connection control system 3, a SIP message containing user authentication information received from the user of the user equipment 2 via the remote controller, as a user authentication request. In this example, the user authentication information consists of user identification information representing a character string for identifying the user of the user equipment 2, and password information representing a character string as a password.

The request transmitter 11 also receives a SIP message containing user authentication success information from the connection control system 3: The user authentication success information is information containing user identification information, and indicating that the user identified by the user identification information (i.e., the user who has input the user authentication information) is a valid user.

Upon receiving the user authentication success information from the connection control system 3, the request transmitter 11 transmits to the connection control system 3 a SIP message containing a process request for requesting the application server system to execute the process, in response to a request transmission instruction input by the user of the user equipment 2. The process request contains user authentication success information (i.e., user identification information).

The play-list receiver 12 receives play-list information transmitted by the application server system 4 (service control functions part 40 to be described later) via the connection control system 3 (core IMS part 30 to be described later).

In this example, the play-list information contains a plurality of pieces of content element information each formed by a set consisting of content identification information for identifying content, and a reproduction start position and reproduction end position of the content identified by the content identification information. The content identification information as used herein is main content identification information for identifying main content or advertisement content identification information (selected advertisement content specification information) for identifying advertisement content.

Further, the play-list information is information containing information indicating a sequence in which the pieces of content (the main content identified by the main content identification information and the advertisement content specified by the selected advertisement content specification information) are output (content output sequence).

The viewing request transmitter 13 transmits the main content viewing request and the advertisement content viewing request to the application server system 4 based on the play-list information received by the play-list receiver 12, if the connection between the user equipment 2 and the application server system 4 is established by the connection control system 3 (core IMS part 30 to be described later).

The main content viewing request contains main content identification information and a reproduction start position. The advertisement content viewing request contains advertisement content identification information (selected advertisement content specification information) and a reproduction start position.

Specifically, the viewing request transmitter 13 transmits a content viewing request (main content viewing request or advertisement content viewing request), one at a time, at a predetermined timing according to the content output sequence indicated by the play-list information received by the play-list receiver 12.

In this example, when the reproduction position of content that is being output by a content outputting part 14 (to be described later) reaches a position located before the reproduction end position associated with the content in the play-list information by a predetermined period of time, the viewing request transmitter 13 transmits to the application server system 4 a content viewing request relating to content defined in the play-list information to be output next to the content that is currently being output.

Further, when the reproduction position of the content that is being output by the content outputting part 14 (to be described later) reaches the reproduction end position associated with the content in the play-list information, the viewing request transmitter 13 transmits to the application server system 4 a reproduction stop request for requesting stopping transmission of content data representing the content, and at the same time transmits to the application server system 4 a reproduction start request for requesting starting transmission of content data representing content defined in the play-list information to be output next to the content that is being currently output.

The content outputting part 14 receives content data transmitted by the application server system 4 and outputs content represented by the received content data (in this example, the content is output by a television receiver). It can be said specifically that the content outputting part 14 receives main content data and advertisement content data and outputs, based on the received main content data and advertisement content data, viewing content in which advertisement content represented by the advertisement content data is inserted in main content represented by the main content data.

(Functions of Connection Control System)

Functions of the connection control system 3 include a core IMS (Internet Protocol Multimedia Subsystem) part 30 and a transport functions (TF) part 80.

The core IMS part 30 includes a call connection controller 31 and an IMS authentication part (user authentication means) 32. The transport functions part 80 includes a bandwidth guarantee part 81 and an equipment authentication part 82.

The call connection controller 31 controls connection between a plurality of devices by exchanging (receiving and transmitting) a SIP message.

When the connection control server 3a receives an equipment authentication request from the user equipment 2, the equipment authentication part 82 authenticates whether or not the user equipment 2 is a valid equipment (executes an equipment authentication process) by determining whether or not equipment specification information contained in the received equipment authentication request corresponds to (coincides with, in this example) equipment authentication reference information. The equipment authentication reference information as used herein is information that is preliminarily stored in a storing device provided in the connection control server 3a. The equipment authentication reference information may be stored in a storing device (user profile server functions part 50 to be described later) provided in the user information management server 4c.

If the user equipment 2 is authenticated to be valid equipment, the equipment authentication part 82 transmits a SIP message containing equipment authentication success information to the user equipment 2.

When the user equipment 2 is authenticated to be a valid equipment by the equipment authentication part 82, the call connection controller 31 subsequently executes a process based on the message (process request or the like) transmitted from the user equipment 2 (for example, a process to transfer the message to the application server system 4).

On the other hand, if the user equipment 2 is not authenticated to be valid equipment by the equipment authentication part 82, the call connection controller 31 does not execute the process based on the message (process request or the like) transmitted from the user equipment 2 from then onward.

Further, when the connection control server 3a receives a user authentication request from the user equipment 2, the IMS authentication part 32 authenticates whether or not the user who has input the user authentication information (the user identified by the user identification information contained in the user authentication information) is a valid user (whether or not the user identified by the user identification information coincides with the user of the user equipment 2) by determining whether or not the user authentication information contained in the user authentication request corresponds to user authentication reference information (executes user authentication). The user authentication reference information as used herein is information that is preliminarily stored in the storing device (user profile server functions part 50 to be described later) provided in the user information management server 4c. This means that the user profile server functions part 50 constitutes user authentication reference information storage means.

When the user who has input the user authentication information is authenticated to be a valid user by the IMS authentication part 32, the call connection controller 31 transmits a SIP message containing User authentication success information to the user equipment 2. However, if the user who has input the user authentication information is not authenticated to be a valid user by the IMS authentication part 32, the call connection controller 31 does not transmit a SIP message containing user authentication success information to the user equipment 2.

Upon receiving a bandwidth guarantee instruction from the service control server 4a, the call connection controller 31 establishes connection between the media server 4b and the user equipment 2. The bandwidth guarantee instruction contains media delivery specification information for specifying the media server 4b, and communication bandwidth information representing a communication bandwidth. The call connection controller 31 transmits, to the transport functions part 80, the received communication bandwidth information and communication channel specification information for specifying a communication channel between the user equipment 2 and the media server 4b specified by the received media delivery specification information.

The bandwidth guarantee part 81 receives the communication bandwidth information and the communication channel specification information from the call connection controller 31, and executes a process to guarantee a communication bandwidth represented by the communication bandwidth information for a communication channel specified by the received communication channel specification information (bandwidth guarantee process).

(Functions of User Information Management Server)

Functions of the user information management server 4c include a user profile server functions (UPSF) part 50.

The user profile server functions part 50 stores profile information of the user of the user equipment 2. The user profile server functions part 50 includes a user basic information storage 51.

The user basic information storage 51 stores user basic information in association with the user identification information for identifying the user of the user equipment 2. The user basic information is information for specifying advertisement attribute information representing an attribute of advertisement content (in this example, categories of advertisement content such as cars, real estate, travel, insurance, cell-phones, coffee, gadgets and so on). In this example, the user basic information contains, as shown in FIG. 3, a plurality of information sets consisting of advertisement attribute information and priority information representing priority levels (in this example, indicated by integer values which increase as the priority level rises). The user basic information forms part of advertisement selection information.

(Functions of Service Control Server)

Functions of the service control server 4a include a service control functions (SCF) part 40.

The service control functions part 40 includes an information transmitter-receiver (delivery request reception means and selected advertisement content specification information transmission means) 41, a content basic information storage 42, an advertisement attribute information storage (part of content storage means, or part of a content storing processing step) 43, an advertisement insertion information storage 44, a play-list generator (advertisement content selection means) 45, and a delivery requesting part 46.

The information transmitter-receiver receives various information (request, instruction, notification, and so on) transmitted by the user equipment 2 or the media server 4b via the core IMS part 30 (routed through the core IMS part 30). Further, the information transmitter-receiver 41 transmits various information to the user equipment 2 or the media server 4b via the core IMS part 30. In this example, the various information is contained in the SIP message.

Only when the service control server 4a receives a process request containing user authentication success information from the user equipment 2, the service control server 4a executes a process according to the process request. Thus, it can be said that the application server system 4 executes a process according to the process request when the user who has input the user authentication information is authenticated to be a valid user by the IMS authentication part 32.

The content basic information storage 42 stores the content basic information in association with main content identification information for identifying the main content. The content basic information is information for specifying advertisement attribute information. In this example, like the user basic information, the content basic information includes a plurality of information sets consisting of advertisement attribute information and priority information representing priority levels. The content basic information forms part of the advertisement selection information.

The advertisement attribute information storage 43 stores advertisement content identification information for identifying advertisement content in association with the advertisement attribute information.

The advertisement insertion information storage 44 stores the main content identification information, number-of-insertions information, and inserting position information in association with each other. The number-of-insertions information is information representing a number of insertions that is a number of items of advertisement content inserted in the main content. The inserting position information is information representing an inserting position that is a position in the main content where the advertisement content is to be inserted (in this example, it is indicated by a play time from the beginning of the main content).

The play-list generator 45 accepts a content delivery request received by the information transmitter-receiver 41 as a process request. The content delivery request is information transmitted by the user equipment 2 and containing user authentication success information (i.e., user identification information), equipment address information, and main content identification information.

The play-list generator 45 acquires, from the user basic information stored in the user basic information storage 51, user basic information stored in association with the user identification information contained in the content delivery request received by the information transmitter-receiver 41.

Further, the a play-list generator 45 acquires, from the content basic information stored in the content basic information storage 42, content basic information stored in association with the main content identification information contained in the content delivery request.

The play-list generator 45 then calculates a final priority level for each item of the advertisement attribute information by combining a priority level represented by the priority information contained in the acquired user basic information and a priority level represented by the priority information contained in the acquired content basic information for each item of the advertisement attribute information.

Subsequently, the play-list generator 45 extracts, from the advertisement content identification information stored in the advertisement attribute information storage 43, advertisement content identification information associated with the item of advertisement attribute information the calculated final priority level of which is the highest.

On the other hand, the play-list generator 45 acquires, from the number-of-insertions information and the insertion position information stored in the advertisement insertion information storage 44, number-of-insertions information and insertion position information stored in association with the main content identification information contained in the content delivery request.

The play-list generator 45 then selects, from the extracted advertisement content identification information, a number of items of advertisement content identification information, the number being that represented by the acquired number-of-insertions information.

Thus, it can be said that the play-list generator 45 selects advertisement content data stored in association with the advertisement attribute information specified on the basis of the user basic information associated with the user identification information for identifying the user of the user equipment 2 which has transmitted the content delivery request and the content basic information associated with the main content identification information contained in the content delivery request.

Subsequently, the play-list generator 45 generates play-list information on the basis of the selected advertisement content identification information (that is, selected advertisement content specification information for specifying the advertisement content data which is selected), the main content identification information contained in the content delivery request and the acquired insertion position information.

Thus, it can be said that the play-list information is information containing the main content identification information contained in the content delivery request and the selected advertisement content specification information specifying the advertisement content data selected by the play-list generator 45.

The delivery requesting part 46 outputs a content delivery instruction. The content delivery instruction contains the play-list information generated by the play-list generator 45, the user authentication success information contained in the content delivery request (i.e., user identification information), the equipment address information, and the main content identification information.

The information transmitter-receiver 41 transmits the content delivery instruction output by the delivery requesting part 46 to the media server 4b via the core IMS part 30.

Further, upon receiving a delivery permission notification transmitted by the media server 4b, the information transmitter-receiver 41 transmits the play-list information generated by the play-list generator 45 to the user equipment 2 via the core IMS part 30. The delivery permission notification contains media delivery specification information for specifying a media server (in this example, the media server 4b) and the play-list information.

(Functions of Media Server)

Functions of the media server 4b include a media functions (MF) part 60. The media functions part 60 includes a media control functions (MCF) part and a media delivery functions (MDF) part.

The media functions part 60 includes an information transmitter-receiver 61, a content data storage (part of content storage means, and part of a content storing processing step) 62, a content delivery controller 63, and a content delivering part (content delivering means) 65.

The information transmitter-receiver 61 receives various information transmitted by the service control server 4a via the core IMS part 30. Specifically, the information transmitter-receiver 61 receives a content delivery instruction and so on transmitted by the service control server 4a via the core IMS part 30. The information transmitter-receiver 61 transmits the various information to the service control server 4a via the core IMS part 30. More specifically, the information transmitter-receiver 61 transmits a delivery permission notification and so on to the service control server 4a via the core IMS part 30.

The content data storage 62 stores main content data representing main content and main content identification information for identifying the main content in association with each other. Further, the content data storage 62 stores advertisement content data representing advertisement content and advertisement content identification information for identifying the advertisement content in association with each other.

The content delivery controller 63 receives a main content viewing request from the user equipment 2. The main content viewing request contains main content identification information, a reproduction start position, and user identification information. The content delivery controller 63 also receives an advertisement content viewing request from the user equipment 2. The advertisement content viewing request contains advertisement content identification information, a reproduction start position, and user identification information.

The content delivery controller 63 receives a reproduction start request from the user equipment 2. In addition, the content delivery controller 63 receives a reproduction stop request from the user equipment 2.

Once a reproduction start request is received by the content delivery controller 63, the content delivering part 65 transmits the content data identified by the content delivery request to the user equipment 2 from the reproduction start position contained in the content viewing request.

The content delivering part 65 transmits the data using a session established by the core IMS part 30, according to a predetermined communication protocol (in this example, RTP (Real-time Transport Protocol)).

Thus, it can be said that the content delivering part 65 transmits content data stored by the content data storage 62 (main content data and advertisement content data) to the user equipment 2 which has transmitted the content delivery request if the connection between the user equipment 2 and the media server 4b is established by the connection control system 3.

Once a reproduction stop request is received by the content delivery controller 63, the content delivering part 65 stops transmitting the content data which is being transmitted.

(Operation)

Next, operation of the aforementioned content delivery system 1 will be described.

(Authentication Operation)

Figure 4:
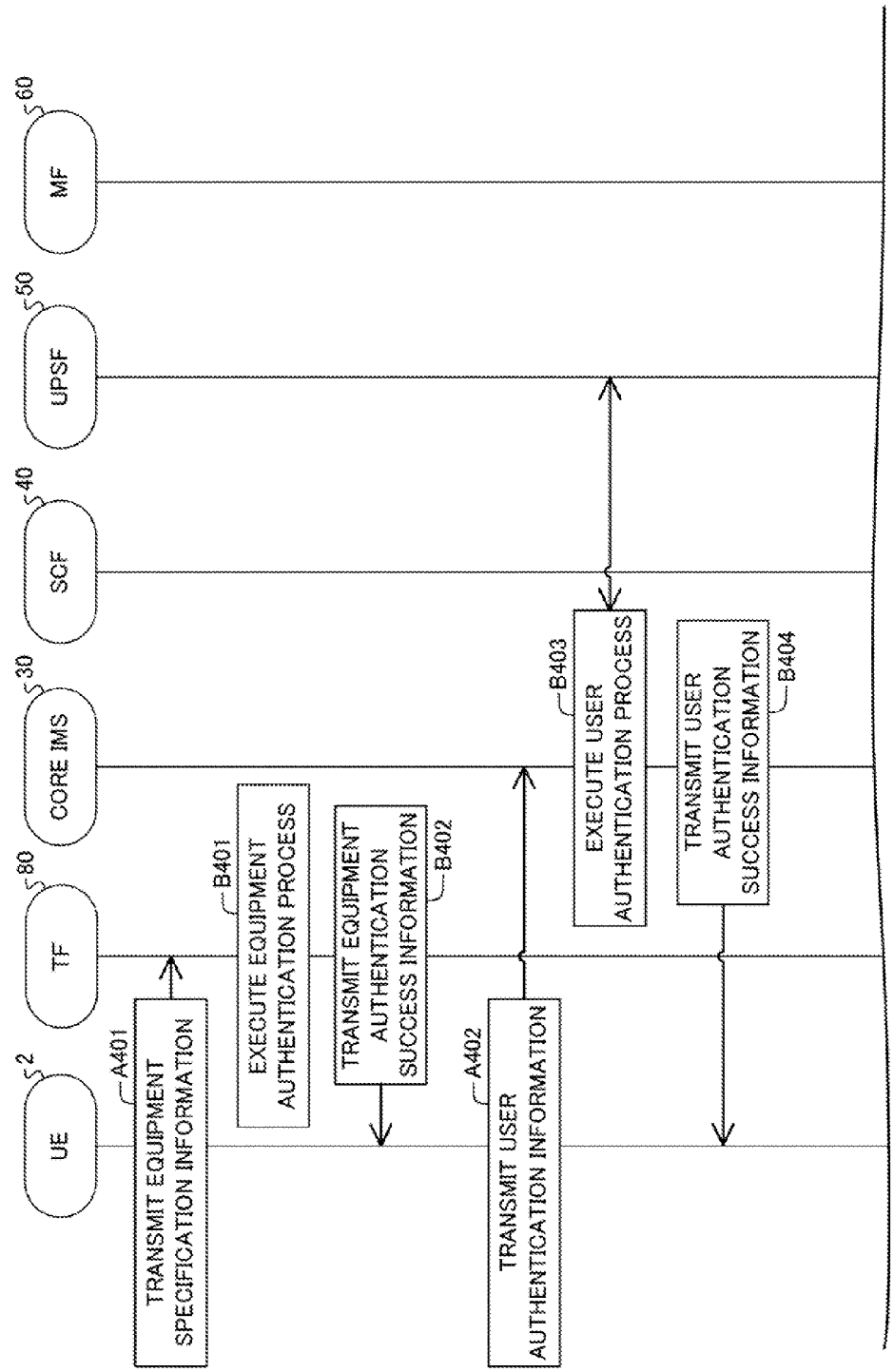
FIG. 4 is a sequence diagram illustrating operation performed by the content delivery system shown in FIG. 1 when authenticating user equipment or a user of the user equipment.

Operation of the content delivery system 1 when the content delivery system 1 authenticates the user of the user equipment 2 will be described with reference to the sequence diagram of FIG. 4.

Firstly, power is supplied to the user equipment 2 by the user setting the state of the power switch of the equipment 2 to ON state. This causes the user equipment 2 to transmit an equipment authentication request containing the stored equipment specification information to the connection control server 3a (transport functions part 80) (step A401).

The transport functions part 80 authenticates whether or not the user equipment 2 is valid equipment (executes an equipment authentication process) by determining whether or not the equipment specification information contained in the received equipment authentication request corresponds to (in this example, coincides with) the preliminarily stored equipment authentication reference information (step B401). If the user equipment 2 is authenticated to be valid equipment, the transport functions part 80 then transmits equipment authentication success information to the user equipment 2 (step B402). The equipment authentication success information is information containing equipment address information and representing that the user equipment 2 is authenticated to be valid equipment.

Upon receiving the equipment authentication success information, the user equipment 2 causes a television receiver (not shown) to display an image to prompt the user UA to input user authentication information. In response to this, the user UA inputs the user authentication information by manipulating a remote controller.

Upon accepting the input of the user authentication information, the user equipment 2 transmits a user authentication request containing the accepted user authentication information to the core IMS part 30 (step A402).

Thus, the core IMS part 30 receives the user authentication request. The core IMS part 30 determines whether or not the user authentication information contained in the received user authentication request corresponds to (in this example, coincides with) the preliminarily stored user authentication reference information, whereby it is authenticated whether or not the user identified by the user identification information contained in the user authentication reference information (the user who has input the user authentication information) is a valid user (executes a user authentication process) by (step B403, user authentication). If the user who has input the user authentication information is authenticated to be a valid user, the core IMS part 30 transmits user authentication success information to the user equipment 2 (step B404).

Thus, the user equipment 2 receives the user authentication success information. After that, the user equipment 2 transmits a process request (a SIP message containing the same) containing the user authentication success information to the core IMS part 30.

(Operation of Content Viewing Process)

Next, operation of the content delivery system 1 when transmitting content data to the user equipment 2 in response to an input by a user of the user equipment 2 will be described with reference to the sequence diagrams of FIGS. 5 and 6.

Firstly, the user of the user equipment 2 inputs to the user equipment 2 information for instructing the user equipment to transmit a process request requesting transmission of content list information representing a list of viewable content. In response to this, the user equipment 2 transmits the process request to the service control server 4*a* (service control functions part 40) via the core IMS part 30.

The service control functions part 40 transmits content list information representing a list of main content represented by the main content data stored in the content data storage 62 to the user equipment 2 via the core IMS part 30. Upon receiving the content list information, the user equipment 2 causes a television receiver (not shown) to display the list of the main content represented by the received content list information.

The content delivery system 1 may be configured such that the content list information is transmitted to the user equipment 2 from a portable server (not shown) which is configured to be communicable with the user equipment 2 according to HTTP (Hypertext Transfer Protocol).

With the list of main content being displayed on the television receiver, the user of the user equipment 2 selects main content that the user wishes to view, and inputs main content identification information for identifying the selected main content.

Figure 5:
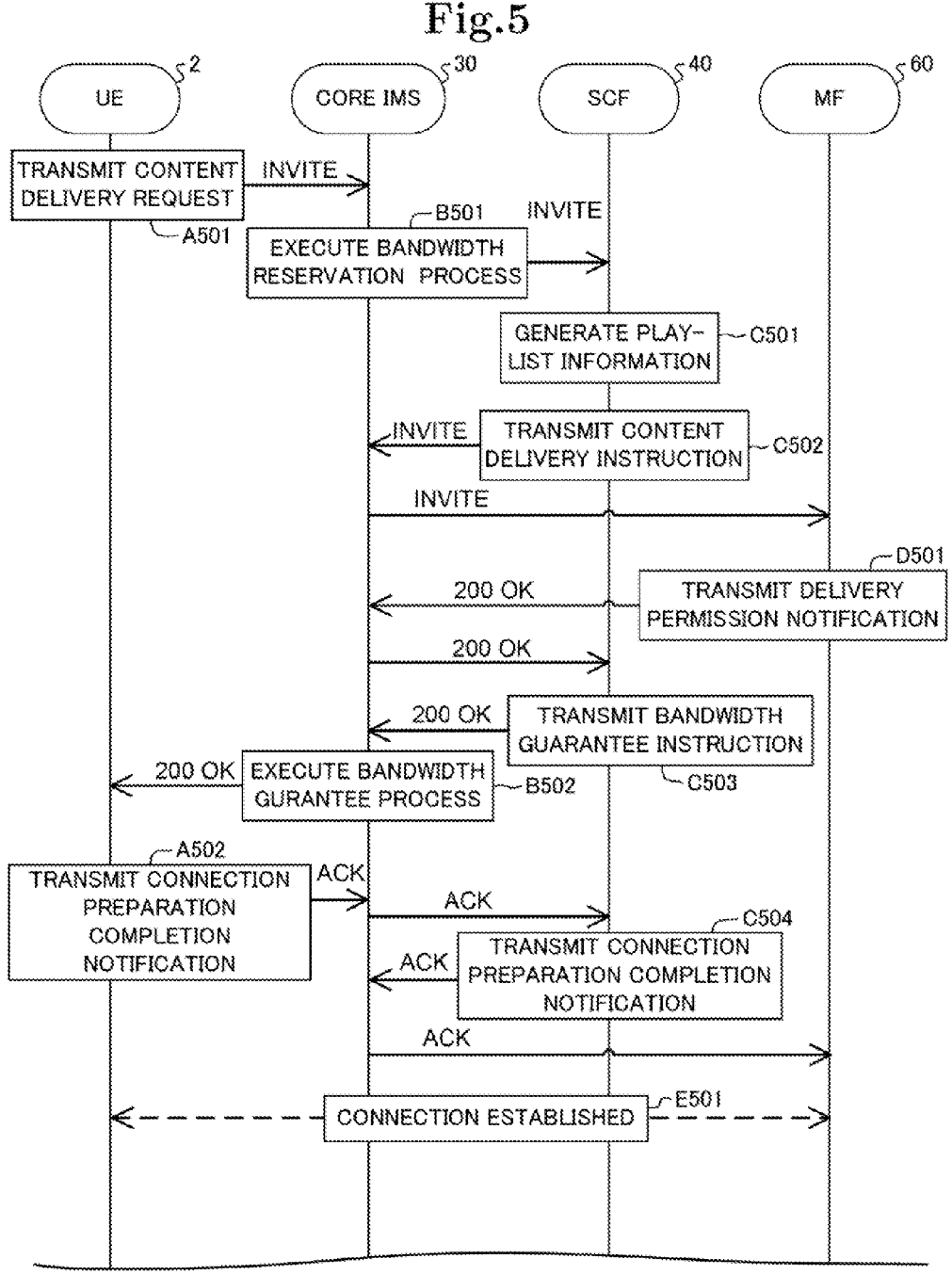
FIG. 5 is a sequence diagram illustrating operation performed by the content delivery system shown in FIG. 1 when transmitting viewing content data to a user equipment in response to an input of the user of the user equipment.

Thus, as shown in FIG. 5, the user equipment 2 transmits to the core IMS part 30 a content delivery request as a process request containing the input main content identification information, user authentication success information as the user identification information for identifying the user, and equipment address information (step A501). The content delivery request is transmitted as an INVITE message (message in which "INVITE" is set as the method) of a SIP message.

The core IMS part 30 thus receives the content delivery request. Subsequently, the core IMS part 30 executes a bandwidth reservation process as preparation for guaranteeing a communication bandwidth. The core IMS part 30 then transmits the received content delivery request to the service control functions part 40 (step B501).

Subsequently, the service control functions part 40 receives the content delivery request (delivery request reception step). The service control functions part 40 acquires user basic information and content basic information on the basis of the user identification information and main content identification information contained in the received content delivery request.

The service control functions part 40 then calculates a final priority level for each item of the advertisement attribute information based on the acquired user basic information and the acquired content basic information. The service control functions part 40 extracts from the advertisement content identification information stored in the advertisement attribute information storage 43, advertisement content identification information associated with the item of advertisement attribute information the calculated final priority level of which is the highest.

On the other hand, the service control functions part 40 acquires, from the number-of-insertions information and the insertion position information stored in the advertisement insertion information storage 44, number-of-insertions information and insertion position information stored in association with the main content identification information contained in the content delivery request.

The service control functions part 40 then selects from the extracted advertisement content identification information, a number of items of advertisement content identification information, the number being that represented by the acquired number-of-insertions information (advertisement content selection step). Subsequently, the service control functions part 40 generates play-list information on the basis of the selected advertisement content identification information, the main content identification information contained in the content delivery request and the acquired insertion position information (step C501). The play-list information is information containing the main content identification information and the selected advertisement content specification information.

The service control functions part 40 then selects a media server 4*b* (media functions part 60), and transmit the content delivery instruction to the selected media functions part 60 via the core IMS part 30 (step C502). The content delivery instruction contains the generated play-list information, the user identification information, and the equipment address information.

The content delivery instruction is transmitted as an INVITE message of a SIP message. As shown in FIG. 7, the INVITE message includes a header HD and a body BD. In this example, the play-list information PL is contained as values in the field of "X-video-sequence" in the header HD of the INVITE message.

In this example, the play-list information PL includes five portions of content element information separated with commas. The first portion of the content element information is formed of a set of values separated with semicolons and consisting of "content1" as the main content identification information, "0" as the reproduction start position of the main content, and "300" as the reproduction end position of the main content. The second portion of the content element information is formed of a set of values separated with semicolons and consisting of "adv1" as the advertisement content identification information, "0" as the reproduction start position of the advertisement content, and "30" as the reproduction end position of the advertisement content. The third to fifth portions of the content element information are formed in the same manner as the first and second portions of the content element information.

The media functions part 60 thus receives the content delivery instruction. Subsequently, the media functions part 60 determines a media server to which the content data is to be transmitted on the basis of the play-list information and the equipment address information contained in the content delivery instruction. Further, the media functions part 60 transmits a delivery permission notification to the service control functions part 40 via the core IMS part 30 (step D501).

The delivery permission notification contains media delivery specification information for specifying the determined media server (in this example, the media server 4*b*), and the play-list information. The delivery permission notification is transmitted as an OK message (response containing "OK" and "200" as a status code in the start line) of a SIP message.

Thus, the service control functions part 40 receives the media delivery specification information and the play-list information. The service control functions part 40 then determines a communication bandwidth required for transmitting the main content data identified by the play-list information, on the basis of the received media delivery specification information and play-list information.

Further, the service control functions part 40 transmits, to the core IMS part 30, a bandwidth guarantee instruction containing communication bandwidth information indicating the determined communication bandwidth, and the received media delivery specification information and play-list information (step C503). The bandwidth guarantee instruction is transmitted as an OK message of a SIP message.

Upon receiving the bandwidth guarantee instruction, the core IMS part 30 transmits, to the transport functions part 80, the received communication bandwidth information and communication channel specification information for specifying a communication channel between the user equipment 2 and the media server 4*b* specified by the received media delivery specification information. Thus, the transport functions part 80 executes a process to guarantee the communication bandwidth represented by the received communication bandwidth information on the communication channel specified by the received communication channel specification information (bandwidth guarantee process).

Upon completing the bandwidth guarantee process, the core IMS part 30 transmits a transmission preparation completion notification to the user equipment 2 (step B502). The transmission preparation completion notification contains the received media delivery specification information and play-list information. The transmission preparation completion notification is transmitted as an OK message of a SIP message.

As described above, the OK message transmitted as a bandwidth guarantee instruction or transmission preparation completion notification is one of connection establishment messages which the core IMS part 30 exchanges with the user equipment 2, the service control functions part 40 and the media functions part 60 in order to establish connection between the user equipment 2 and the media functions part 60.

Thus, it can be said that the service control functions part 40 transmits the selected advertisement content specification information to the user equipment 2 via the core IMS part 30 by incorporating the selected advertisement content specification information in the connection establishment message (selected advertisement content specification information transmission step).

It can be said, in other words, that the service control functions part 40 transmits play-list information containing the selected advertisement content specification information to the user equipment 2 via the core IMS part 30 when the core IMS part 30 executes a process for establishing connection between the user equipment 2 and the media functions part 60.

Upon receiving the transmission preparation completion notification (selected advertisement content specification information reception step), the user equipment 2 transmits a connection preparation completion notification to the service control functions part 40 via the core IMS part 30 (step A502). The connection preparation completion notification is transmitted as an ACK message (message in which "ACK" is set as the method) of a SIP message.

Upon receiving the connection preparation completion notification, the service control functions part 40 transmits a connection preparation completion notification that is the same as the received connection preparation completion notification to the media functions part 60 via the core IMS part 30 (step C504). This connection preparation completion notification is also transmitted as an ACK message of a SIP message.

The connection (session) between the media server 4*b* and the user equipment 2 is established by the media functions part 60 receiving the connection preparation completion notification (step E501). The processes in step A501 to step E501 together make up a connection establishment step. It can be said that the core IMS part 30 establishes the connection between the media server 4*b* (media functions part 60) and the user equipment 2 by relaying the SIP message.

It can also be said that the SIP message which the connection control system 3 (core IMS part 30) exchanges with the user equipment 2, the service control server 4*a* and the media server 4*b* in step A501 to step E501 is a connection establishment message for the connection control system 3 establishing connection between the user equipment 2 and the media server 4*b*.

In this example, both of the connection for performing communication according to RTSP (Real Time Streaming Protocol) and the connection for performing communication according to RTP are established simultaneously.

Figure 6:
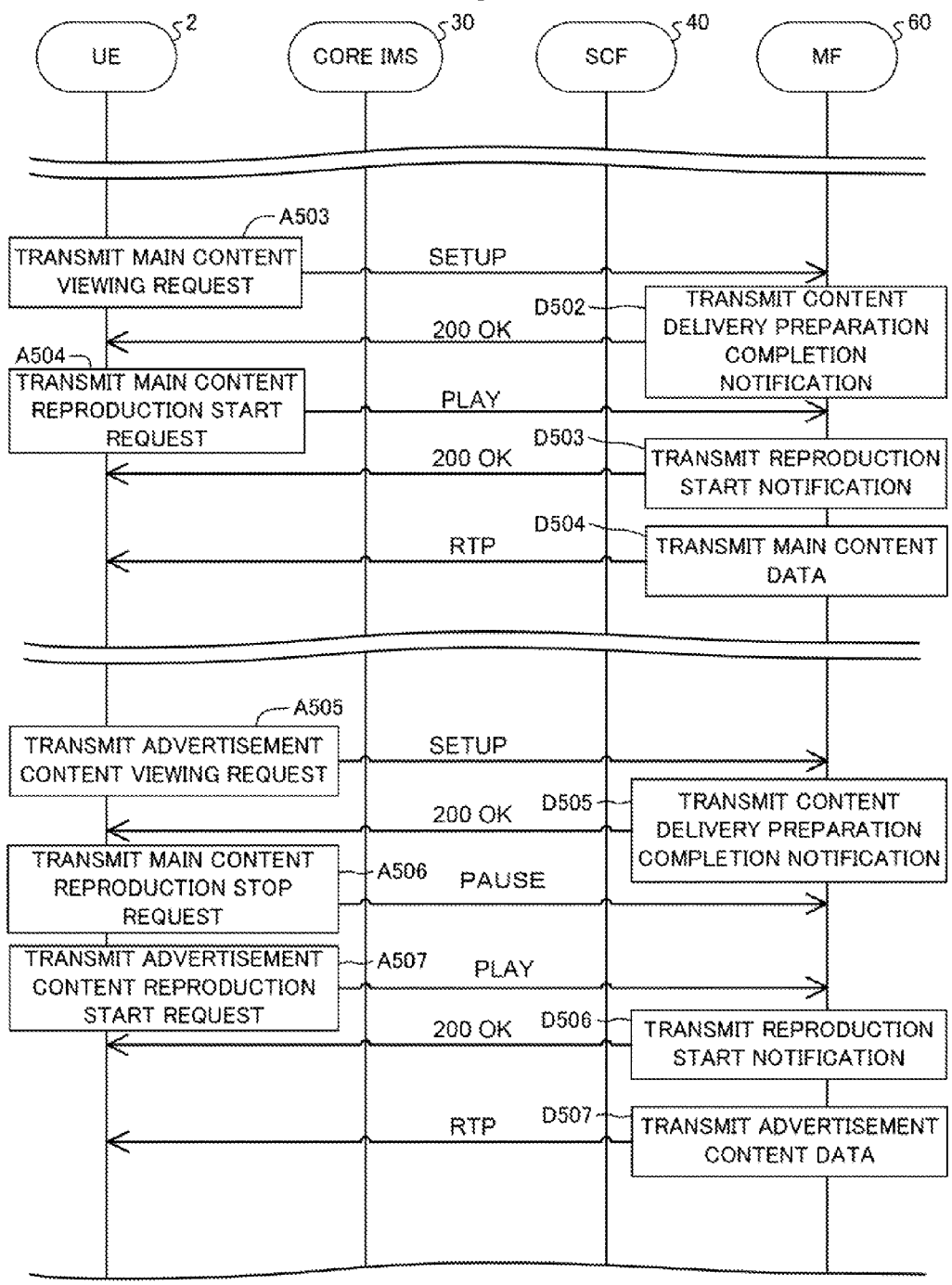
FIG. 6 is a sequence diagram illustrating operation performed by the content delivery system shown in FIG. 1 when transmitting viewing content data to the user equipment in response to an input of the user of the user equipment.
Figure 11:
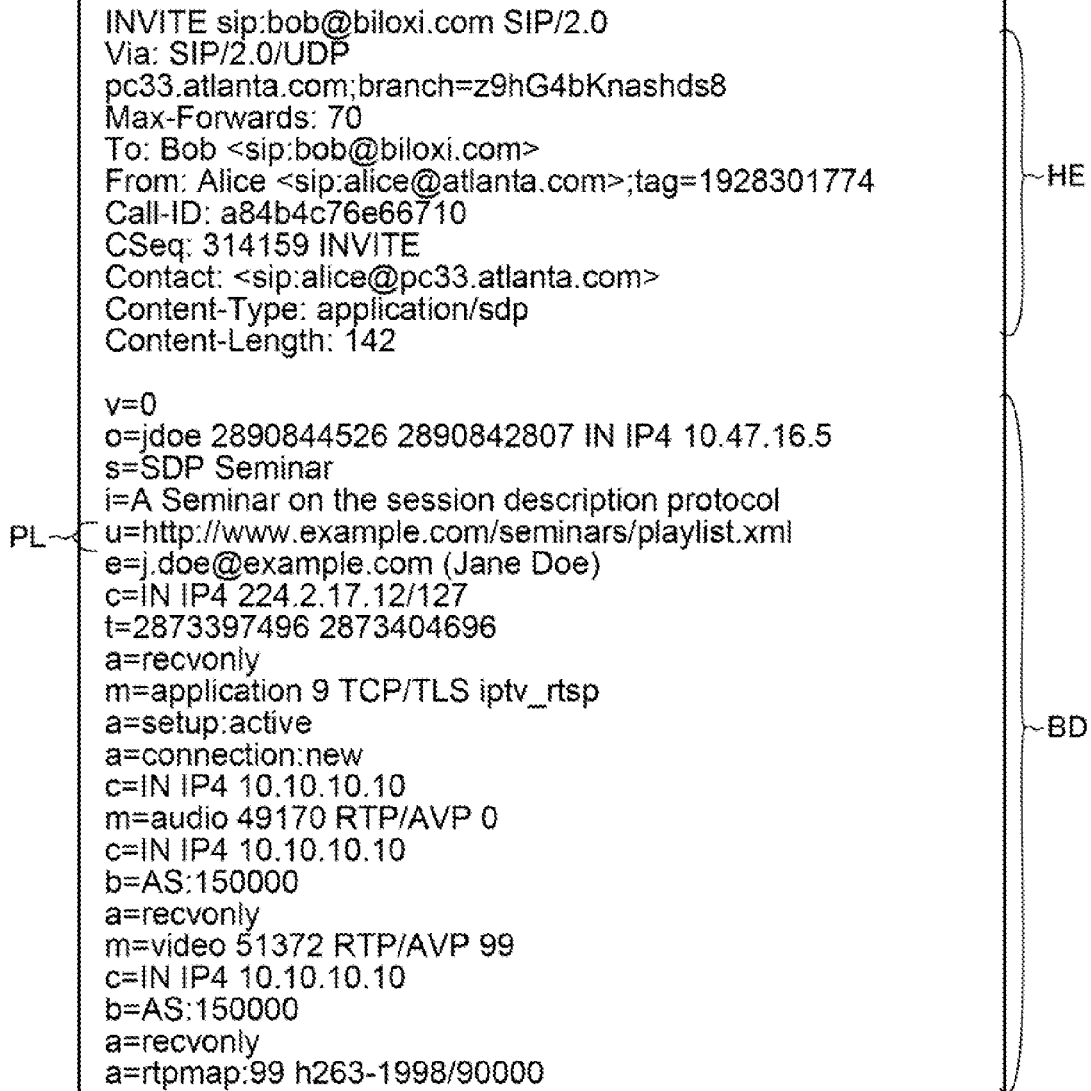
FIG. 11 is a diagram showing an INVITE message containing a content delivery instruction according to a modification of the first embodiment.

As shown in FIG. 6, the user equipment 2 then transmits a content viewing request based on the play-list information PL contained in the received transmission preparation completion notification to a media server 4*b* (media functions part 60) specified by the media delivery specification information contained in the received transmission preparation completion notification (content viewing request transmission step).

More specifically, the user equipment 2 firstly transmits, to the media functions part 60, a content viewing request (main content viewing request, in this example) containing content identification information ("content1" in this example) contained in the leading portion of the content element information (i.e., first portion of the content element information) in the play-list information PL, and the reproduction start position ("0" in this example) contained in that portion of the content element information (step A503).

The content viewing request further contains user identification information for identifying a user of the user equipment 2. The content viewing request is transmitted as a SETUP message (message in which "SETUP" is set as the method) of a RTSP message (message according to RTSP).

The media functions part 60 then receives the content viewing request. Subsequently, the media functions part 60 acquires, from the advertisement content data and main content data stored in the content data storage 62, content data identified by the content identification information contained in the received content viewing request.

The media functions part 60 then transmits a content delivery preparation completion notification to the user equipment 2 which has transmitted the content viewing request (step D502). The content delivery preparation completion notification is transmitted as an OK message (response containing "OK" and "200" as a status code in the start line) of a RTSP message.

Upon receiving the content delivery preparation completion notification, the user equipment 2 transmits, to the media functions part 60, a reproduction start request for the content relating to the content viewing request transmitted in step A503 (here, the main content identified by "content1" of the main content identification information) (step A504). The reproduction start request is transmitted as a PLAY message (message in which "PLAY" is set as the method) of a RTSP message.

Subsequently, upon receiving the reproduction start request, the media functions part 60 transmits a reproduction start notification to the user equipment 2 (step D503). The reproduction start notification is information indicating that transmission of the content data is started. The reproduction start notification is transmitted as an OK message of a RTSP message.

The media functions part 60 then transmits the content data identified by the received content viewing request (here, the main content data) to the user equipment 2 from the reproduction start position ("0" in this example) (step D504, content delivery step). This transmission of the data is performed by the media functions part 60 using the session established by the core IMS part 30 according to RTP.

Thus, the user equipment 2 receives the content data and causes the television receiver (not shown) to display the content represented by the received content data (here, the main content identified by the main content identification information "contend") (content output step).

After that, when the reproduction position of the content that is being output reaches a position located before the reproduction end position associated with this content in the play-list information PL ("300" in this example) by a predetermined period of time, the user equipment 2 transmits, to the media functions part 60, a content viewing request (advertisement content viewing request, in this example) containing content identification information ("adv1" in this example) contained in the content element information located next to the content element information relating to the content that is being output in the play-list information PL (that is, the second portion of the content element information), and a reproduction start position contained in that content element information ("0" in this example) (step A505).

The media functions part 60 receives the content viewing request. Subsequently, the media functions part 60 transmits a content delivery preparation completion notification to the user equipment 2 which has transmitted the content viewing request, in the same manner as in step D502 described above (step D505).

When the reproduction position of the content which is being output reaches the reproduction end position associated with the content in the play-list information PL ("300" in this example), the user equipment 2 transmits, to the media functions part 60, a reproduction stop request for requesting stopping transmission of the content data representing that content (i.e. the main content) (step A506). The reproduction stop request is transmitted as a PAUSE message (message in which "PAUSE" is set as the method) of a RTSP message.

Subsequently, upon receiving the reproduction stop request, the media functions part 60 stops transmission of the content data.

Further, the user equipment 2 transmits to the media functions part 60 a reproduction start request for requesting reproduction of the content relating to the content viewing request transmitted in step A505 described above (here, the advertisement content identified by the advertisement content identification information "adv1") (step A507).

Subsequently, upon receiving the reproduction start request, the media functions part 60 transmits a reproduction start notification to the user equipment 2 (step D506). The media functions part 60 then transmits the content data identified by the received content viewing request (here, the advertisement content data) to the user equipment 2 from the reproduction start position contained in the content viewing request ("0" in this example) (step D507, content delivery step).

Thus, the user equipment 2 receives the content data and causes a television receiver (not shown) to display the content represented by the received content data (here, the advertisement content identified by the advertisement content identification information "adv1").

By repeatedly performing the processes as described above, the user equipment 2 outputs, based on the play-list information PL, the viewing content in which the advertisement content represented by the advertisement content data is inserted in the main content represented by the main content data.

According to the first embodiment of the content delivery system of the invention, the content delivery system 1 transmits to the user equipment 2 selected advertisement content specification information for selecting advertisement content selected based on advertisement selection information. Accordingly, it is possible to cause the user to view viewing content in which advertisement content corresponding to the advertisement selection information is inserted.

Further, according to the first embodiment described above, the application server system 4 can be allowed to determine a sequence in which the main content and the advertisement content are output by the user equipment 2. This makes it possible to cause the user to view the advertisement content in such a manner that the intent of an advertiser who provides the advertisement content is reflected more clearly.

Further, in the first embodiment described above, the advertisement selection information contains user basic information associated with the user identification information. This enables the content delivery system 1 to cause a user of the user equipment 2 which has transmitted a content delivery request to view viewing content in which advertisement content according to the user is inserted.

In addition, in the first embodiment described above, the advertisement selection information contains the content basic information associated with the main content identification information. This enables the content delivery system 1 to cause the user to view the viewing content in which the advertisement content selected according to the main content identified by the main content identification information contained in the received content delivery request is inserted.

Further, in the first embodiment, the service control functions part 40 is configured to transmit play-list information containing selected advertisement content specification information to the user equipment 2 via the connection control system 3 when the connection control system 3 executes a process for establishing connection. This enables the service control server 4a to transmit to the user equipment 2 the play-list information in which the latest advertisement selection information at the time when the connection control system 3 executes a process for establishing connection is reflected.

In addition, in the first embodiment described above, the service control functions part 40 is configured to transmit play-list information containing selected advertisement content specification information to the user equipment 2 via the connection control system 3 by incorporating the play-list information into a connection establishment message.

According to this configuration, no other message than the connection establishment message need be transmitted for the service control server 4a transmitting the play-list information to the user equipment 2. This means that the number of communications can be reduced among the connection control system 3, the service control server 4a and the user equipment 2. In other words, the processing load and/or communication load required for the connection control system 3, the service control server 4a and the user equipment 2 to exchange messages can be relieved.

Although in the first embodiment described above, the play-list information is contained in the header HD of the INVITE message, the play-list information may be contained in the start line (Request-Line) of the INVITE message. For example, as shown in FIG. 8, the play-list information PL may be contained in the Request-URI (Uniform Resource Identifier) in the start line.

Although in the first embodiment described above, the play-list information is contained in the header HD of the INVITE message, the play-list information may be contained in the body BD of the INVITE message. For example, as shown in FIG. 9, the play-list information PL may be contained in the body BD as a value of "videosequence" in the values of type "a" in SDP (Session Description Protocol).

Further, although in the first embodiment described above, the play-list information is contained in the header HD of an INVITE message, the body BD of the INVITE message may be formed of a first part according to a first format and a second part according to a second format (that is, the body BD is multi-parted), and the play-list information may be contained in one of the first and second parts.

For example, as shown in FIG. 10, the body may include a first part BD1 according to SDP format and a second part BD2 according to text format, and the play-list information may be contained in the second part BD2.

Further, although in the first embodiment described above, the play-list information is contained directly in the INVITE message, reference information may be contained in the INVITE message so that the play-list information can be referred to in the reference information. For example, as show in FIG. 11, reference information (substantially play-list information) PL representing the URI for referring to (acquiring) the play-list information may be contained in the INVITE message as the value of the type "u" in SDP in the body BD.

The first embodiment described above is configured to simultaneously establish both of the connection for performing communication according to RTSP (RTSP connection) and the connection for performing communication according to RTP (RTP connection) by the execution of the processes of step A501 to step E501. In another modification of the first embodiment, the configuration may be such that the RTSP connection is established first by the execution of the processes of step A501 to step E501 and then the RTP connection is established by the execution of the same processes as those in step A501 to step E501.

While in the first embodiment described above, the content delivery system 1 is designed to establish only one connection (RTP connection) for communication according to RTP in order to transmit main content data and advertisement content data, the content delivery system 1 may be designed to establish two RTP connections consisting of a RTP connection for transmitting main content data and a RTP connection for transmitting advertisement content data.

While in the first embodiment described above, the service control functions part 40 is designed to transmit play-list information to the media functions part 60, service control functions part 40 may be designed to transmit play-list information only to the user equipment 2 without transmitting the play-list information to the media functions part 60 (that is, without incorporating the play-list information in the content delivery instruction).

First Modification of the First Embodiment

A content delivery system according to a first modification of the first embodiment of the present invention will be described. This content delivery system according to the first modification is different from the content delivery system according to the first embodiment in that the play-list information is contained in a message other than the connection establishment message. Therefore, the following description will be made focusing on the difference.

Figure 12:
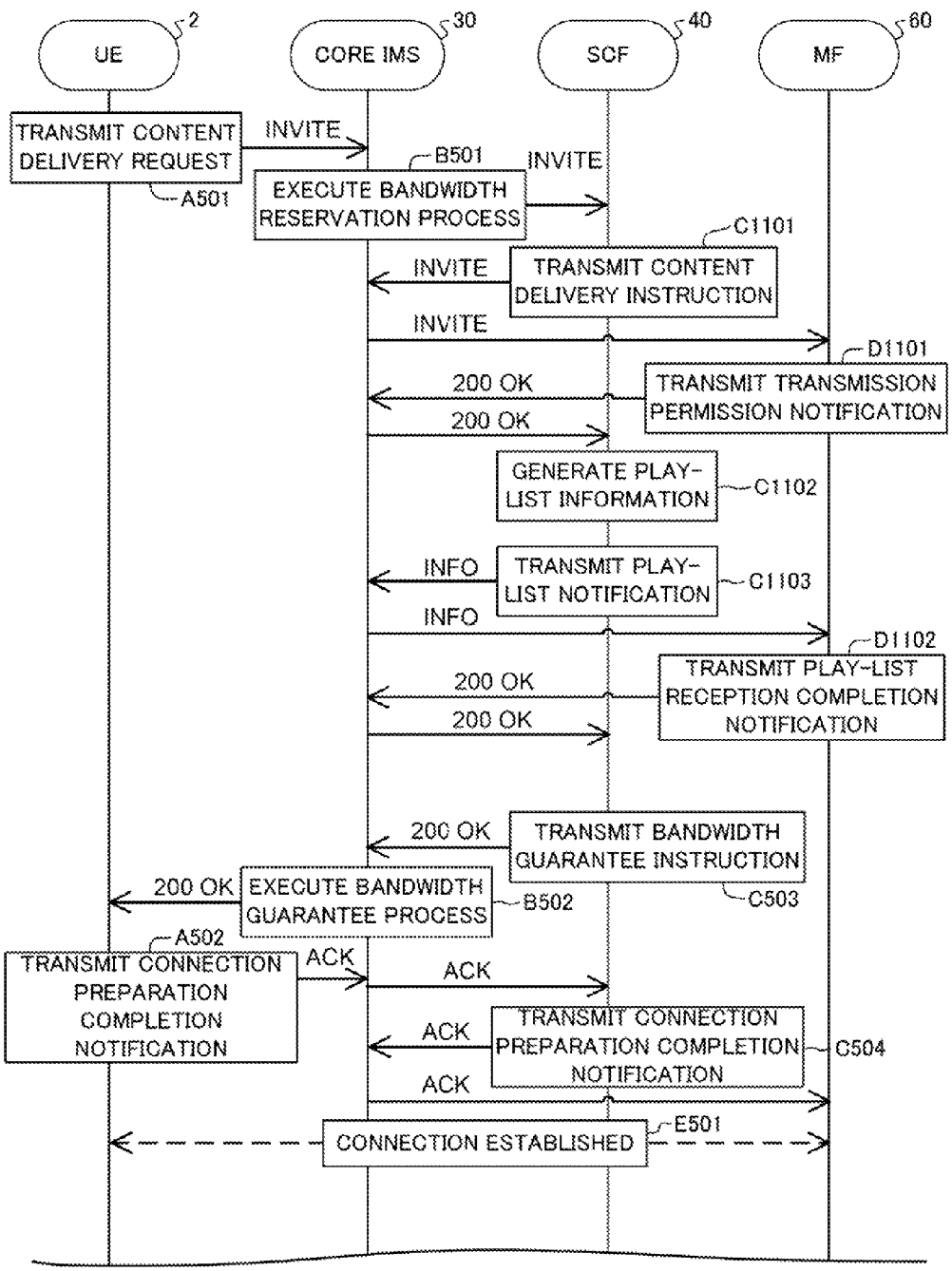
FIG. 12 is a sequence diagram showing operation performed by a content delivery system according to a first modification of the first embodiment when transmitting viewing content data to the user equipment in response to an input of the user of the user equipment.

Unlike the first embodiment, the service control functions part 40 according to the first modification does not generate play-list information upon receiving a content delivery request transmitted by the user equipment 2. The service control functions part 40 transmits a content delivery instruction containing no play-list information to the media functions part 60 via the core IMS part 30, as shown in FIG. 12 (step C1101).

Upon receiving the content delivery instruction, the media functions part 60 transmits a delivery permission notification to the service control functions part 40 via the core IMS part 3 in the same manner as in step D501 according to the first embodiment (step D1101). The delivery permission notification is transmitted as an OK message of a SIP message.

Upon receiving the delivery permission notification, the service control functions part 40 generates play-list information in the same manner as in step C501 according to the first embodiment (step C1102). Subsequently, the service control functions part 40 transmits a play-list notification containing the generated play-list information to the media functions part 60 via the core IMS part 30 (step C1103). The play-list notification is transmitted as an INFO message (message in which "INFO" is set as the method) of a SIP message. The play-list notification may be transmitted as a MESSAGE message (message in which "MESSAGE" is set as the method) in a SIP message.

Thus, the media functions part 60 receives the play-list notification. The media functions part 60 then transmits a play-list reception completion notification to the service control functions part 40 via the core IMS part 30 (step D1102). The play-list reception completion notification is information containing play-list information and indicating that the play-list notification has been received. The play-list reception completion notification is transmitted as an OK message of a SIP message.

Upon receiving the play-list reception completion notification, the service control functions part 40 transmits the play-list information to the user equipment 2 via the core IMS part 30 in the same manner as in step C503 according to the first embodiment. Further, the content delivery system establishes connection between the user equipment 2 and the media server 4b by executing the same processes as those in step C503 and onwards according to the first embodiment, and transmits content data from the media server 4b to the user equipment 2.

This first modification also provides the same advantages and effects as those of the first embodiment.

Second Modification of the First Embodiment

A content delivery system according to a second modification of the first embodiment of the present invention will be described. This content delivery system according to the second modification differs from the content delivery system according to the first embodiment in that the play-list information is contained in a message other than the connection establishment message. Therefore, the following description will be made focusing on the difference.

Figure 13:
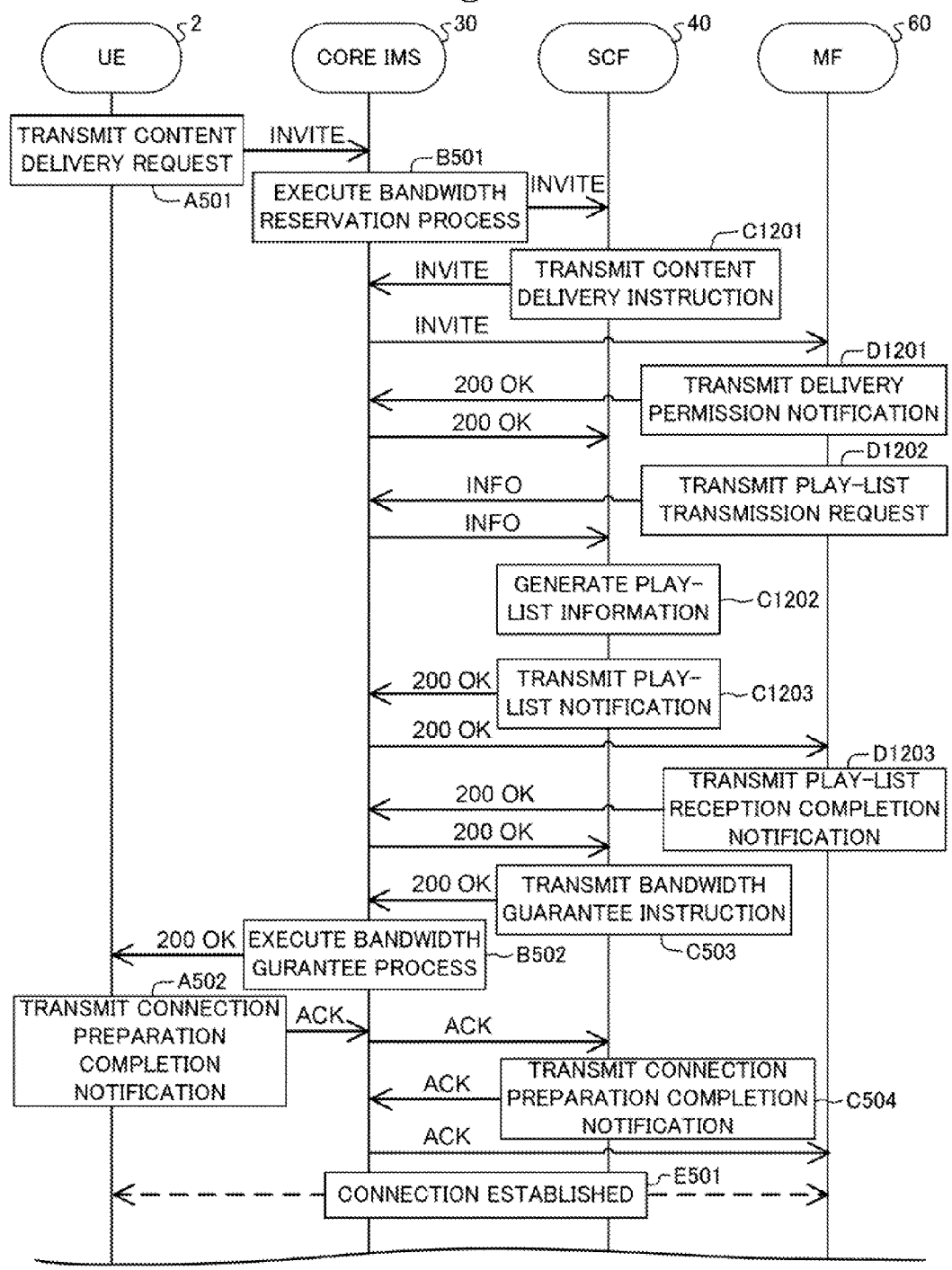
FIG. 13 is a sequence diagram showing operation performed by a content delivery system according to a second modification of the first embodiment when transmitting viewing content data to the user equipment in response to an input of the user of the user equipment.

Unlike the first embodiment, the service control functions part 40 according to the second modification does not generate play-list information upon receiving a content delivery request transmitted by the user equipment 2. The service control functions part 40 transmits a content delivery instruction containing no play-list information to the media functions part 60 via the core IMS part 30, as shown in FIG. 13 (step C1201).

Upon receiving the content delivery instruction, the media functions part 60 transmits a delivery permission notification to the service control functions part 40 via the core IMS part 30 in the same manner as in step D501 according to the first embodiment (step D1201). The delivery permission notification is transmitted as an OK message of a SIP message.

Further, the media functions part 60 transmits a play-list transmission request to the service control functions part 40 via the core IMS part 30 (step D1202). The play-list transmission request contains user identification information, equipment address information and main content identification information contained in the received content delivery instruction, and is information indicating a request for transmission of play-list information. The play-list transmission request is transmitted as an INFO message of a SIP message. The play-list transmission request may be transmitted as a MESSAGE message of a SIP message.

Upon receiving the play-list transmission request, the service control functions part 40 generates play-list information in the same manner as in step C501 according to the first embodiment (step C1202). Subsequently, the service control functions part 40 transmits a play-list notification containing the generated play-list information to the media functions part 60 via the core IMS part 30 (step C1203). The play-list notification is transmitted as an OK message of a SIP message.

Thus, the media functions part 60 receives the play-list notification. The media functions part 60 then transmits a play-list reception completion notification to the service control functions part 40 via the core IMS part 30 (step D1203). The play-list reception completion notification is information containing play-list information and indicating that the play-list notification has been received. The play-list reception completion notification is transmitted as an OK message of a SIP message.

Upon receiving the play-list reception completion notification, the service control functions part 40 transmits the play-list information to the user equipment 2 via the core IMS part 30 in the same manner as in step C503 according to the first embodiment. Further, the content delivery system 1 establishes connection between the user equipment 2 and the media server 4b and transmits content data from the media server 4b to the user equipment 2 by executing the same processes as those in step C503 and onwards according to the first embodiment.

This second modification also provides the same advantages and effects as those of the first embodiment.

Second Embodiment

Next, a content delivery system according to a second embodiment of the present invention will be described. The content delivery system according to the second embodiment differs from the content delivery system according to the first embodiment in that while advertisement attribute information is transmitted to the media functions part 60 from the service control functions part 40, the media functions part 60 generates play-list information based on this advertisement attribute information. Therefore, the following description will be made focusing on the difference.

Figure 14:
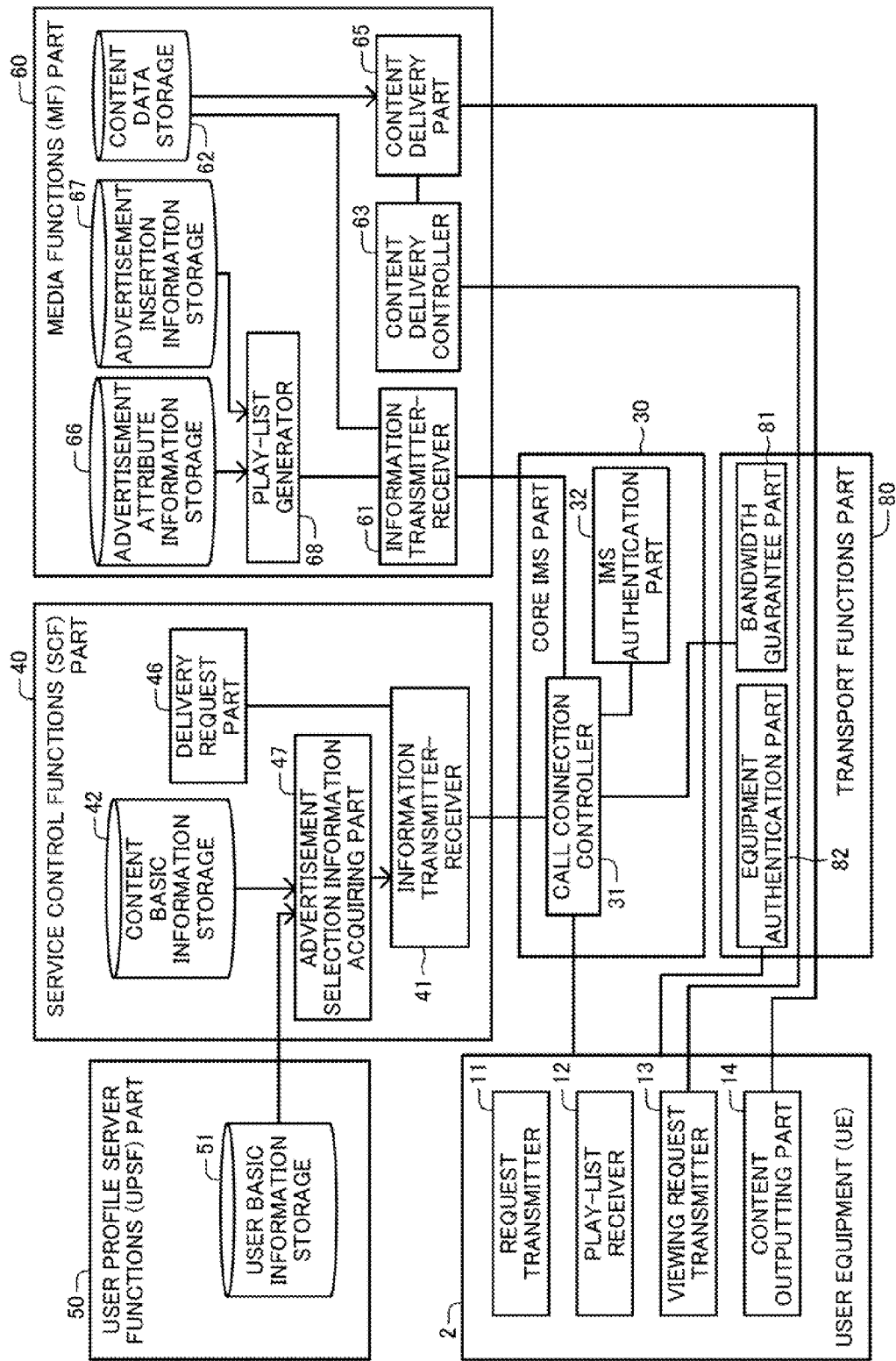
FIG. 14 is a block diagram schematically illustrating a content delivery system according to a second embodiment of the present invention.
Figure 17:
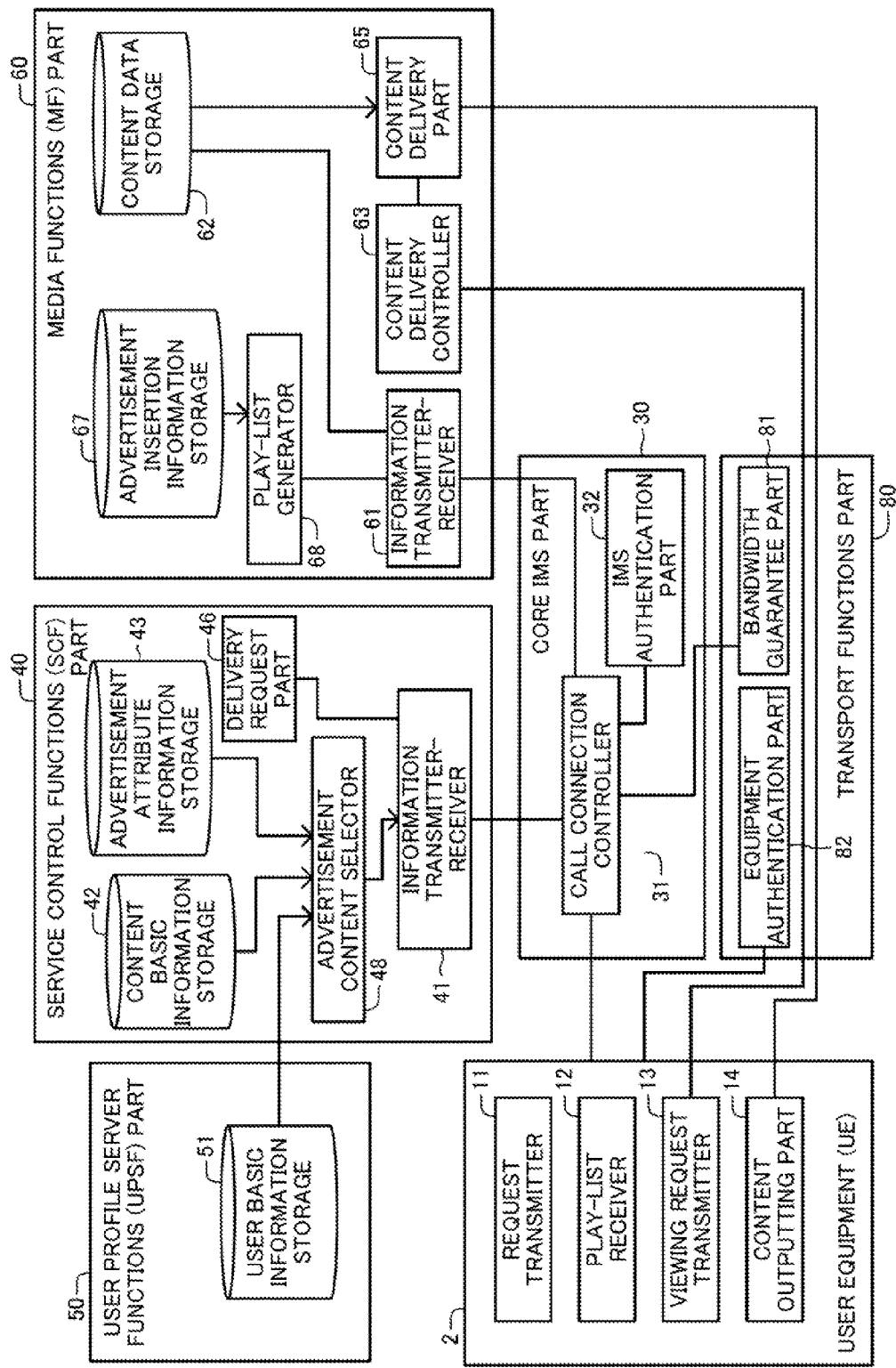
FIG. 17 is a block diagram schematically illustrating functions of a content delivery system according to a third embodiment of the present invention.

As shown in FIG. 14, the service control functions part 40 according to the second embodiment does not include the advertisement attribute information storage 43, the advertisement insertion information storage 44, or the a play-list generator 45. The service control functions part 40 instead includes an advertisement selection information acquiring part 47.

The advertisement selection information acquiring part 47 accepts a content delivery request as a process request received by the information transmitter-receiver 41. The advertisement selection information acquiring part 47 acquires, from the user basic information stored in the user basic information storage 51, user basic information stored in association with the user identification information contained in the content delivery request received by the information transmitter-receiver 41.

Further, the advertisement selection information acquiring part 47 acquires, from the content basic information stored in the content basic information storage 42, content basic information stored in association with the main content identification information contained in the content delivery request.

The delivery requesting part 46 outputs a content delivery instruction. The content delivery instruction contains advertisement selection information containing the user basic information and content basic information acquired by the advertisement selection information acquiring part 47, and user authentication success information (i.e., user identification information), equipment address information and main content identification information contained in the content delivery request.

The information transmitter-receiver (delivery request reception means and advertisement selection information transmission means) 41 transmits the content delivery instruction output by the delivery requesting part 46 to the media server 4b via the core IMS part 30.

The media functions part 60 includes an advertisement attribute information storage 66 similar to the advertisement attribute information storage 43, an advertisement insertion information storage 67 similar to the advertisement insertion information storage 44, and a play-list generator (advertisement content selection means) 68 similar to the play-list generator 45.

The play-list generator 68 acquires advertisement selection information contained in the content delivery instruction received by the information transmitter-receiver (advertisement selection information reception means) 61. The a play-list generator 68 then calculates a final priority level for each item of the advertisement attribute information based on the acquired advertisement selection information. Subsequently, the play-list generator 68 extracts, from the advertisement content identification information stored in the advertisement attribute information storage 66, advertisement content identification information associated with the item of advertisement attribute information the calculated final priority level of which is the highest.

On the other hand, the play-list generator 68 acquires, from the number-of-insertions information and insertion position information stored in the advertisement insertion information storage 67, number-of-insertions information and insertion position information stored in association with the main content identification information contained in the content delivery instruction.

The play-list generator 68 selects, from the extracted advertisement content identification information, a number of items of advertisement content identification information, the number being that represented by the acquired number-of-insertions information. Subsequently, the play-list generator 68 generates play-list information based on the selected advertisement content identification information, the main content identification information contained in the content delivery instruction, and the acquired insertion position information.

The information transmitter-receiver then transmits the play-list information generated by the play-list generator 68 to the user equipment 2 via the service control functions part 40 and the core IMS part 30.

Unlike the first embodiment, the service control functions part 40 according to the second embodiment does not generate play-list information upon receiving the content delivery request transmitted by the user equipment 2 (delivery request reception step). As shown in FIG. 15, the service control functions part 40 transmits a content delivery instruction containing advertisement selection information instead of the play-list information, to the media functions part 60 via the core IMS part 30 (step C1401, advertisement selection information transmission step).

The content delivery instruction is transmitted as an INVITE message in a SIP message. As shown in FIG. 15, the INVITE message includes a header HD and a body BD. In this example, the user basic information UI in the advertisement selection information is contained as values of the field "X-user-favorite" in the header HD of the INVITE message. The content basic information CI in the advertisement selection information is contained as values of the field "X-content-favorite" in the header HD of the INVITE message.

In this example, each of the user basic information UI and the content basic information CI includes portions of element information separated with commas. Each portion of the element information is separated into two parts with semicolons. The leading part of the two parts represents advertisement attribute information (e.g., "car" represents cars, and "real estate" represents real estate), while the end part represents priority information.

This INVITE message is one of connection establishment messages which the core IMS part 30 exchanges with the user equipment 2, the service control functions part 40 and the media functions part 60 so that the core IMS part 30 establishes connection between the user equipment 2 and media functions part 60.

It can be said that the service control functions part 40 transmits the advertisement selection information to the media functions part 60 (media server 4b) via the core IMS part 30 by incorporating the advertisement selection information in the connection establishment message.

In other words, it can be said that the service control functions part 40 transmits play-list information containing advertisement selection information to the media server 4b via the core IMS part 30 when the core IMS part 30 executes a process for establishing connection between the user equipment 2 and the media functions part 60.

The media functions part 60 receives the content delivery instruction transmitted by the service control functions part 40. Subsequently, the media functions part 60 acquires advertisement selection information contained in the received content delivery instruction.

Subsequently, the media functions part 60 selects advertisement content identification information based on the acquired advertisement selection information, the advertisement content identification information stored in the advertisement attribute information storage 66, and the number-of-insertions information and insertion position information stored in the advertisement insertion information storage 67 (advertisement content selection step). Further, the media functions part 60 generates play-list information based on the selected advertisement content identification information, the main content identification information contained in the content delivery instruction, and the insertion position information stored in the advertisement insertion information storage 67 (step D1401).

The media functions part 60 then transmits a delivery permission notification containing the generated play-list information to the service control functions part 40 via the core IMS part 30 in the same manner as in step D501 according to the first embodiment (step D501).

Upon receiving the delivery permission notification, the service control functions part 40 transmits the play-list information to the user equipment 2 via the core IMS part 30 in the same manner as in step C503 according to the first embodiment. Further, the content delivery system 1 establishes connection between the user equipment 2 and the media server 4b and transmits the content data to the user equipment 2 from the media server 4b by executing the same processes as those in steps C503 and onwards according to the first embodiment.

In the second embodiment of the content delivery system according to the present invention, as described above, like the first embodiment, the content delivery system 1 transmits, to the user equipment 2, selected advertisement content specification information for specifying the advertisement content selected based on advertisement selection information. Therefore, it is possible to cause the user to view the viewing content in which the advertisement content selected according to the advertisement selection information is inserted.

Further, according to the second embodiment described above, the application server system 4 is enabled to determine a sequence in which the main content and the advertisement content are output by the user equipment 2. This makes it possible to cause the user to view the advertisement content in such a manner that the intent of an advertiser who provides the advertisement content is reflected more clearly.

Further, in the second embodiment, the advertisement selection information contains user basic information associated with user identification information. This enables the content delivery system 1 to cause a user of the user equipment 2 which has transmitted a content delivery request to view viewing content in which advertisement content selected according to the user is inserted.

In addition, in the second embodiment, the advertisement selection information contains content basic information associated with main content identification information. This enables the content delivery system 1 to cause the user to view viewing content in which advertisement content selected according to main content identified by the main content identification information contained in the content delivery request is inserted.

Further, in the second embodiment, the service control functions part 40 is configured to transmit advertisement selection information to the media server 4b via the connection control system 3 when the connection control system 3 executes a process for establishing connection. This enables the service control server 4a to transmit to the media server 4b the latest advertisement selection information at the time when the connection control system 3 executes the process for establishing connection. As a result, the media server 4b is able to select advertisement content data based on this updated advertisement selection information.

In addition, in the second embodiment, the service control functions part 40 is configured to transmit the advertisement selection information to the media server 4b via the connection control system 3 by incorporating the advertisement selection information in a connection establishment message.

This releases the service control server 4a from the need to transmit other messages than the connection establishment message in order to transmit the advertisement selection information to the media server 4b. This means that the number of communications performed among the connection control system 3, the service control server 4a and the media server 4b can be reduced. In other words, the processing load and/or the communication load required for the connection control system 3, the service control server 4a and the media server 4b to exchange messages can be reduced.

Third Embodiment

Next, a content delivery system according to a third embodiment of the present invention will be described. The content delivery system according to the third embodiment differs from the content delivery system according to the first embodiment in that while selected advertisement content specification information is transmitted from the service control functions part 40 to the media functions part 60, the media functions part 60 generates play-list information based on the selected advertisement content specification information. Therefore, the following description will be made focusing on the difference.

The service control functions part 40 according to the third embodiment as shown in FIG. 16 does not include the advertisement insertion information storage 44 or the play-list generator 45. The service control functions part 40 includes an advertisement content selector (advertisement content selection means) 48.

The content basic information storage 42 according to the third embodiment stores content basic information and number-of-insertions information in association with main content identification information for identifying main content.

The advertisement content selector 48 accepts a content delivery request as a process request received by the information transmitter-receiver 41. The advertisement content selector 48 acquires, from the user basic information stored in the user basic information storage 51, user basic information stored in association with the user identification information contained in the content delivery request received by the information transmitter-receiver 41.

Further, the advertisement content selector 48 acquires, from the content basic information stored in the content basic information storage 42, content basic information stored in association with the main content identification information contained in the content delivery request.

The advertisement content selector 48 then calculates a final priority level for each item of the advertisement attribute information, based on the acquired user basic information and the acquired content basic information. Subsequently, the advertisement content selector 48 extracts, from the advertisement content identification information stored in the advertisement attribute information storage 43, advertisement content identification information associated with the item of advertisement attribute information the calculated final priority level of which is the highest.

On the other hand, the advertisement content selector 48 acquires, from the number-of-insertions information stored in the content basic information storage 42, number-of-insertions information stored in association with the main content identification information contained in the content delivery request. The advertisement content selector 48 then selects, from the extracted advertisement content identification information, a number of items of advertisement content identification information, the number being that represented by the acquired number-of-insertions information.

The delivery requesting part 46 outputs a content delivery instruction. The content delivery instruction includes selected advertisement content specification information containing the advertisement content identification information selected by the advertisement content selector 48, and user authentication success information (i.e., user identification information), equipment address information and main content identification information contained in the content delivery request.

The information transmitter-receiver (delivery request reception means and selected advertisement content specification information transmission means) 41 transmits the content delivery instruction output by the delivery requesting part 46 to the media server 4b via the core IMS part 30.

The media functions part 60 includes an advertisement insertion information storage 67 similar to the advertisement insertion information storage 44, and a play-list generator 68 similar to the play-list generator 45.

The play-list generator 68 acquires selected advertisement content specification information contained in the content delivery instruction received by the information transmitter-receiver 61.

On the other hand, the play-list generator 68 acquires, from the insertion position information stored in the advertisement insertion information storage 67, insertion position information stored in association with the main content identification information contained in the content delivery instruction.

The play-list generator 68 then venerates play-list information based on the advertisement content identification information contained in the acquired selected advertisement content specification information, the main content identification information contained in the content delivery instruction, and the acquired insertion position information.

The information transmitter-receiver 61 then transmits the play-list information generated by the play-list generator 68 to the user equipment 2 via the service control functions part 40 and the core IMS part 30.

Unlike the first embodiment, the service control functions part 40 according to the third embodiment does not generate play-list information upon receiving the content delivery request transmitted by the user equipment 2 (delivery request reception step). As shown in FIG. 18, the service control functions part 40 transmits a content delivery instruction containing selected advertisement content specification information instead of play-list information to the media functions part 60 via the core IMS part 30 (step C1701).

The content delivery instruction is transmitted as an INVITE message of a SIP message. As shown in FIG. 19, the INVITE message includes a header HD and a body BD. In this example, selected advertisement content specification information AD is contained as values of the field "X-video-advertisement" in the header HD of the INVITE message. In this example, the selected advertisement content specification information AD includes advertisement content identification information separated with commas.

This INVITE message is one of connection establishment messages which the core IMS part 30 exchanges with the user equipment 2, the service control functions part 40 and the media functions part 60 so that the core IMS part 30 establishes connection between the user equipment 2 and the media functions part 60.

It can be said that the service control functions part 40 transmits selected advertisement content specification information to the media functions part 60 (media server 4b) via the core IMS part 30 by incorporating the selected advertisement content specification information in the connection establishment message.

In other words, it can be said that the service control functions part 40 transmits play-list information containing the selected advertisement content specification information to the media server 4b via the core IMS part 30 when the core IMS part 30 executes a process for establishing connection between the user equipment 2 and the media functions part 60.

Upon receiving the content delivery instruction, the media functions part 60 acquires selected advertisement content specification information contained in the received content delivery instruction. Subsequently, the media functions part 60 generates play-list information based on advertisement content identification information contained in the acquired selected advertisement content specification information, insertion position information stored in the advertisement insertion information storage 67, and main content identification information contained in the content delivery instruction (step D1701).

Subsequently, the media functions part 60 transmits a delivery permission notification containing the generated play-list information to the service control functions part 40 via the core IMS part 30 in the same manner as in step D501 according to the first embodiment (step D501).

Upon receiving the delivery permission notification, the service control functions part 40 transmits the play-list information to the user equipment 2 via the core IMS part 30 in the same manner as in step C503 according to the first embodiment (selected advertisement content specification information transmission step). Further, the content delivery system 1 establishes connection between the user equipment 2 and the media server 4b and transmits content data to the user equipment 2 from the media server 4b by executing the same processes as those in step C503 and onwards according to the first embodiment.

This third embodiment is also capable of providing the same advantages and effects as those of the second embodiment.

Fourth Embodiment

Next, a content delivery system according to a fourth embodiment of the present invention will be described with reference to FIG. 20.

The content delivery system 1 according to the fourth embodiment includes an application server system and a connection control system. The connection control system is configured to receive equipment specification information transmitted by user equipment and to establish connection between the application server system and the user equipment based on the received equipment specification information.

The content delivery system 1 further includes a content storage (content storage means) RC, delivery request receiver (delivery request reception means) 101, an advertisement content selector (advertisement content selection means) 102, and a selected advertisement content specification information transmitter (selected advertisement content specification information transmission means) 103.

The content storage RC stores advertisement content data representing advertisement content and main content data representing main content.

The delivery request receiver 101 receives, via the connection control system 3, a content delivery request containing main content identification information for identifying main content and transmitted by the user equipment 2.

The advertisement content selector 102 selects the advertisement content data stored in the content storage RC based on advertisement selection information containing advertisement attribute information representing an attribute of the advertisement content.

The selected advertisement content specification information transmitter 103 transmits selected advertisement content specification information for specifying advertisement content data selected by the advertisement content selector 102 via the connection control system 3 to the user equipment 2 which has transmitted the content delivery request.

According to this configuration, the content delivery system 1 transmits to the user equipment 2 the selected advertisement content specification information for specifying the advertisement content selected based on the advertisement selection information. In this manner, it is made possible to cause a user of the user equipment 2 to view viewing content in which main content (desired viewing content) and/or advertisement content/selected according to the user is inserted, for example, by configuring the user equipment 2 to output viewing content in which advertisement content specified by the selected advertisement content specification information is inserted, and configuring the application server system 4 to select the main content and/or the advertisement content according to the user.

In this case, it is preferable that: the user equipment comprises: selected advertisement content specification information reception means for receiving the selected advertisement content specification information transmitted by the application server system; and content viewing request transmission means for transmitting, to the application server system, a main content viewing request containing the main content identification information and an advertisement content viewing request containing the received selected advertisement content specification information when connection with the application server system is established by the connection control system, and the application server system comprises content delivering means for receiving the main content viewing request transmitted by the user equipment and transmitting main content data identified by the main content identification information contained in the received main content viewing request to the user equipment, and for receiving the advertisement content viewing request transmitted by the user equipment and transmitting advertisement content data specified by the selected advertisement content specification information contained in the received advertisement content viewing request to the user equipment.

In this case, it is preferable that the user equipment comprises content outputting means for receiving main content data and advertisement content data transmitted by the application server system and outputting, based on the received main content data and advertisement content data, viewing content in which advertisement content represented by the advertisement content data is inserted in main content represented by the main content data.

This makes it possible to cause the user to view viewing content in which main content (desired viewing content) and/or advertisement content according to the user are/is inserted, for example, by configuring the application server system to select main content and/or advertisement content according to the user.

In this case, it is preferable that: the selected advertisement content specification information transmission means is configured to transmit via the connection control system to the user equipment which has transmitted the content delivery request, play-list information which is information containing the main content identification information contained in the content delivery request and the selected advertisement content specification information, and is information containing information indicating a sequence in which the main content identified by the main content identification information and the advertisement content specified by the selected advertisement content specification information are output; the selected advertisement content specification information reception means is configured to receive the play-list information transmitted by the application server system; and the content viewing request transmission means is configured to transmit the main content viewing request and the advertisement content viewing request to the application server system, based on the received play-list information.

This enables the application server system to determine a sequence in which main content and advertisement content are output by the user equipment. Accordingly, it is made possible to cause the user to view advertisement content in which the intent of an advertiser who provides the advertisement content is reflected more clearly.

In this case, the content storage means is configured to store the advertisement content data in association with the advertisement attribute information representing an attribute of the advertisement content represented by the advertisement content data; the advertisement selection information contains content basic information that is information for specifying the advertisement attribute information and is information associated with the main content identification information for identifying the main content; and the advertisement content selection means is configured to select advertisement content data stored in association with the advertisement attribute information specified by the content basic information associated with the main content identification information contained in the received content delivery request.

This enables the content delivery system to cause a user of the user equipment which has transmitted the content delivery request to view viewing content in which advertisement content selected according to the user is inserted.

In this case, it is preferable that the content storage means is configured to store the advertisement content data in association with the advertisement attribute information representing an attribute of the advertisement content represented by the advertisement content data; the advertisement selection information contains content basic information that is information for specifying the advertisement attribute information and is information associated with the main content identification information for identifying the main content; and the advertisement content selection means is configured to select advertisement content data stored in association with the advertisement attribute information specified by the content basic information associated with the main content identification information contained in the received content delivery request.

This enables the content delivery system to cause the user to view viewing content in which advertisement content selected according to the main content identified by the main content identification information contained in the received content delivery request is inserted.

In this case, it is preferable that the selected advertisement content specification information transmission means is configured to transmit the selected advertisement content specification information to the user equipment via the connection control system when the connection control system executes a process for establishing the connection.

When the application server system is configured to transmit the selected advertisement content specification information to the user equipment before the connection control system executes a process for establishing connection, and if the advertisement selection information is altered after transmission of the selected advertisement content specification information, this altered advertisement selection information cannot be reflected in the selected advertisement content specification information received by the user equipment.

According to the configuration of the invention above, however, the application server system is capable of transmitting to the user equipment the selected advertisement content specification information in which the latest advertisement selection information at the time when the connection control system executes a process for establishing connection is reflected.

In this case, it is preferable that: the connection control system is configured to establish the connection by exchanging a predetermined connection establishment message with the user equipment and the application server system; and the selected advertisement content specification information transmission means is configured to transmit the selected advertisement content specification information to the user equipment via the connection control system by incorporating the selected advertisement content specification information in the connection establishment message.

This eliminates the need of the application server system to transmit any other message than the connection establishment message in order to transmit the selected advertisement content specification information to the user equipment. This means that the number of communications performed among the connection control system, the service control server, and the user equipment can be reduced. In other words, the processing load and/or communication load required for the connection control system, the application server system and the user equipment to exchange messages can be reduced.

In this case, it is preferable that: the application server system comprises a service control server and a media server; the service control server comprises the delivery request reception means, the advertisement content selection means, and the selected advertisement content specification information transmission means; and the media server comprises the content storage means.

In another embodiment of the content delivery system, it is preferable that: the application server system comprises a service control server and a media server; the service control server comprises the delivery request reception means; the media server comprises the content storage means, the advertisement content selection means, and the selected advertisement content specification information transmission means; the service control server further comprises advertisement selection information transmission means for transmitting the advertisement selection information to the media server via the connection control system; the media server further comprises advertisement selection information reception means for receiving the advertisement selection information transmitted by the service control server; and the advertisement content selection means is configured to select the advertisement content data based on the received advertisement selection information.

Another aspect of the present invention provides a content delivery system including an application server system and a connection control system. The connection control system includes a core IMS (Internet Protocol Multimedia Subsystem) part for receiving equipment specification information transmitted by user equipment and establishing connection between the application server system and the user equipment based on the received equipment specification information, and the application server system includes: a media functions part for transmitting content data representing content to the user equipment with which connection is established by the core IMS part; a service control functions part for controlling a service provided by the media functions part; and a user profile server functions part for storing profile information of a user of the user equipment. The media functions part includes content storage means for storing advertisement content data representing advertisement content and main content data representing main content, and the service control functions part includes: delivery request reception means for receiving a content delivery request containing main content identification information for identifying the main content and transmitted by the user equipment; advertisement content selection means for selecting the stored advertisement content data based on advertisement selection information containing advertisement attribute information representing an attribute of the advertisement content and preliminarily stored by the user profile server functions part, the service control functions part or the connection control system; and selected advertisement content specification information transmission means for transmitting selected advertisement content specification information for specifying the selected advertisement content data, via the core IMS part to the user equipment which has transmitted the content delivery request.

In this case, it is preferable that the user equipment includes: selected advertisement content specification information reception means for receiving the selected advertisement content specification information transmitted by the service control functions part; and content viewing request transmission means for transmitting, to the media functions part, a main content viewing request containing the main content identification information and an advertisement content viewing request containing the selected advertisement content specification information, when connection with the media functions part is established by the core IMS part, and the media functions part comprises content delivering means for receiving the main content viewing request transmitted by the user equipment and transmitting to the user equipment main content data identified by the main content identification information contained in the received main content viewing request, and for receiving the advertisement content viewing request transmitted by the user equipment and transmitting to the user equipment advertisement content data specified by the selected advertisement content specification information contained in the received advertisement content viewing request.

In this case, it is preferable that the user equipment includes content outputting means for receiving main content data and advertisement content data transmitted by the media functions part, and outputting, based on the received main content data and advertisement content data, viewing content in which advertisement content represented by the advertisement content data is inserted in main content represented by the main content data.

In this case, it is preferable that the selected advertisement content specification information transmission means is configured to transmit, via the core IMS part to the user equipment which has transmitted the content delivery request, play-list information that is information containing the main content identification information contained in the content delivery request and the selected advertisement content specification information, and is information containing information indicating a sequence in which the main content identified by the main content identification information and the advertisement content specified by the selected advertisement content specification information are output; the selected advertisement content specification information reception means is configured to receive the play-list information transmitted by the service control functions part; and the content viewing request transmission means is configured to transmit the main content viewing request and the advertisement content viewing request to the media functions part, based on the received play-list information.

Another aspect of the present invention relates to a content delivery method comprising: receiving equipment specification information transmitted by user equipment and establishing connection between an application server system and the user equipment based on the received equipment specification information, by a connection control system; receiving, via the connection control system, a content delivery request containing main content identification information for identifying main content and transmitted by the user equipment, by the application server system; selecting advertisement content data stored in a storing device for storing advertisement content data representing advertisement content and main content data representing main content, based on advertisement selection information containing advertisement attribute information representing an attribute of advertisement content; and transmitting selected advertisement content specification information specifying the selected advertisement content data via the connection control system to the user equipment which has transmitted the content delivery request, by the application server system.

In this case, the content delivery method preferably includes: receiving the selected advertisement content specification information transmitted by the application server system, by the user equipment; transmitting, to the application server system, a main content viewing request containing the main content identification information and an advertisement content viewing request containing the received selected advertisement content specification information, by the user equipment, when connection between the user equipment and the application server system is established by the connection control system; and receiving the main content viewing request transmitted by the user equipment and transmitting main content data identified by main content identification information contained in the received main content viewing request to the user equipment, and receiving the advertisement content viewing request transmitted by the user equipment and transmitting advertisement content data specified by selected advertisement content specification information contained in the received advertisement content viewing request to the user equipment, by the application server system.

In this case, the content delivery method preferably includes receiving the main content data and the advertisement content data transmitted by the application server system, and outputting, based on the received main content data and advertisement content data, viewing content in which advertisement content represented by the advertisement content data is inserted in main content represented by the main content data, by the user equipment.

In this case, the content delivery method preferably includes: transmitting, via the connection control system to the user equipment which has transmitted the content delivery request, play-list information that is information containing the main content identification information contained in the content delivery request and the selected advertisement content specification information, and is information containing information indicating a sequence in which the main content identified by the main content identification information and the advertisement content specified by the selected advertisement content specification information are output, by the application server system; receiving the play-list information transmitted by the application server system, by the user equipment; and transmitting the main content viewing request and the advertisement content viewing request to the application server system based on the received play-list information, by the user equipment.

Another aspect of the present invention relates to a computer program comprising instructions for causing a service control server to realize: delivery request reception means for receiving a content delivery request containing main content identification information for identifying main content and transmitted by user equipment, via a connection control system establishing connection between a media server and the user equipment; advertisement content selection means for selecting advertisement content data preliminarily stored in a storing device based on advertisement selection information containing advertisement attribute information representing an attribute of advertisement content; and selected advertisement content specification information transmission means for transmitting selected advertisement content specification information specifying the selected advertisement content data, via the connection control system to the user equipment which has transmitted the content delivery request.

In this case, the selected advertisement content specification information transmission means is preferably configured to transmit, via the connection control system to the user equipment which has transmitted the content delivery request, play-list information which is information containing the main content identification information contained in the content delivery request and the selected advertisement content specification information, and is information containing information indicating a sequence in which main content identified by the main content identification information and advertisement content specified by the selected advertisement content specification information are output.

Still another aspect of the present invention relates to a computer program further comprising instructions for causing user equipment to realize: selected advertisement content specification information reception means for receiving selected advertisement content specification information which is information for specifying selected advertisement content data and transmitted by an application server system, via a connection control system establishing connection between the application server system and the user equipment; and content viewing request transmission means for transmitting, to the application server system, a main content viewing request containing main content identification information for identifying main content and an advertisement content viewing request containing the received selected advertisement content specification information, when connection with the application server system is established by the connection control system.

In this case, the computer program preferably further comprises instructions for causing the user equipment to realize content outputting means for receiving the main content data and the advertisement content data transmitted by the application server system, and outputting, based on the received main content data and advertisement content data, viewing content in which advertisement content represented by the advertisement content data is inserted in main content represented by the main content data.

In this case, it is preferable that the selected advertisement content specification information reception means is configured to receive play-list information which is information containing the main content identification information and the selected advertisement content specification information, and containing information indicating a sequence in which main content identified by the main content identification information and advertisement content specified by the selected advertisement content specification information are output, and is information transmitted by the application server system; and the content viewing request transmission means is configured to transmit the main content viewing request and the advertisement content viewing request to the application server system, based on the received play-list information.

The invention of the content delivery method or program having the configuration as described above is also capable of achieving the object of the present invention since it has the same advantageous effects as those of the content delivery system described above.

Although the present invention has been described in conjunction with the exemplary embodiments above, the invention is not limited to these embodiments. Configuration and particulars of the present invention may be altered variously as conceivable by those skilled in the art without departing from the scope of the claims of the present invention. For example, an arbitrary combination of the embodiments and modification examples described above may be employed as a modification of the embodiments.

Although in the embodiments described above, the advertisement selection information contains both of user basic information and content basic information, it may contain only one of the user basic information and the content basic information.

Although in the embodiments described above, the user profile server functions part 50 is configured to include the user basic information storage 51, the service control functions part 40 instead of the user profile server functions part 50 may be configured to include the user basic information storage 51. In other words, the service control functions part 40 may store the user basic information in association with the user identification information.

Although in the embodiments described above, the advertisement selection information contains the user basic information and the content basic information, the advertisement selection information may contain user equipment position information representing the position of the user equipment 2, date-and-time-of-transmission information representing the date and time (day of the week may also be included) when the content delivery request is transmitted, and/or user attribute information representing an attribute of the user who has transmitted the content delivery request (e.g., the user's place of residence, age, gender, height, weight and/or occupation), in place of the user basic information and/or the content basic information, or in addition to the user basic information and the content basic information. In this case, the content delivery system 1 may be configured to transmit the user equipment position information stored in the core IMS part 30 to the media functions part 60.

Although in the embodiments described above, the content element information contained in the play-list information is composed of a combination of content identification information, and reproduction start position and reproduction end position of content identified by the content identification information, the play-list information may be composed only of the content identification information. In this case, the content data stored in the content data storage 62 is preferably data representing respective portions of the content generated by dividing a single item of main content at positions where advertisement content is inserted.

Although in the embodiments described above, the final priority level is calculated by combining a priority level represented by priority information contained in the user basic information and a priority level represented by priority information contained in the content basic information. Alternatively, the final priority level may be calculated by combining a value obtained by multiplying the priority level represented by the priority information contained in the user basic information by a first factor and a value obtained by multiplying the priority level represented by the priority information contained in the content basic information by a second factor.

Although in the embodiments above, the advertisement attribute information associated with the advertisement content to be selected is composed only of a single item of advertisement attribute information (the calculated final priority level of which is the highest), the advertisement attribute information may be composed of a plurality of items of advertisement attribute information. In this case, each of the embodiments described above is preferably configured such that an item of advertisement attribute information associated with advertisement content the calculated final priority level of which is higher is selected with a higher priority.

In a modification of the embodiments above, a server may be provided having functions of both of the service control server 4a and the media server 4b, in place of the service control server 4a and the media server 4b.

Further, in a modification of the embodiments above, a server may be provided having functions of both of the service control server 4a and the user information management server 4c, in place of the service control server 4a and the user information management server 4c.

Although the media server 4b has the entire media functions part 60 in the embodiments described above, configuration may be such that a first server has part of the media functions part 60 (media control functions part) and a second server has the remaining part of the media functions part 60 (media delivery functions part).

In a modification of the embodiments above, a plurality of servers having the media delivery functions of the media functions part 60 may be provided.

Although the connection control system 3 includes a plurality of connection control servers (connection control servers 3a, 3b and so on) in the modifications of the embodiments above, the connection control system 3 may include a single connection control server.

Although in the embodiments above, the content delivery system 1 is configured to transmit the play-list information or the advertisement attribute information according to SIP, it may be configured to transmit according to another communication protocol (such as RTSP).

Although the user equipment 2 is a set-top box in the embodiments above, the user equipment 2 may be a cellphone, a PDA (Personal Data Assistance), a Smartphone, a PHS (Personal Handyphone System), a game machine, car navigation equipment, a personal computer, or the like.

Further, although the content is video in the embodiments above, the content may be images only or audio only.

Although in the embodiments above the components of the content delivery system 1 is described as those forming the IMS (IP Multimedia Subsystem), they may be described as components forming a MMS (Multimedia Messaging Service).

Although in the embodiments above, the computer program is stored in the storing device, the computer program may be stored in a computer-readable recording medium. For example, the recording medium may be a medium with portability, such as a flexible disk, optical disk, a magneto-optical disk, and a semiconductor memory.

Although in the embodiments above the functions of the content delivery system 1 are realized by the CPU executing the computer program (software), they may be realized by hardware such a circuit or the like.

The present invention is the National Phase of PCT/JP2009/006140, filed Nov. 17, 2009, which is based upon and claims the benefit of priority from Japanese patent application No. 2008-294270 filed Nov. 18, 2008, the disclosure of which is incorporated herein in its entirety by reference.

INDUSTRIAL APPLICABILITY

The present invention is applicable to video-on-demand systems for content delivery via IP networks, and IPTV systems for TV broadcasting via IP networks.

The invention claimed is:
1. A content delivery system comprising an application server system and one or more connection control servers,
   the one or more connection control servers being configured to receive equipment specification information transmitted by a user equipment and establish a connection between the application server system and the user equipment based on the received equipment specification information,
   the application server system comprising:
      a memory for storing sub content data representing sub content and main content data representing main content;

a first receiver for receiving a content delivery request transmitted by the user equipment and containing main content identification information for identifying the main content;

a processor for selecting the stored sub content data based on selection information containing attribute information representing an attribute of the sub content; and a first transmitter for transmitting selected sub content specification information for specifying the selected sub content data via the one or more connection control servers to the user equipment which has transmitted the content delivery request, wherein the first transmitter is configured to, at a same time that the one or more connection control servers executes a process for guaranteeing a communication bandwidth required for transmitting content data as a process for establishing the connection, transmit the play-list information via the one or more connection control servers to the user equipment which has transmitted the content delivery request, the play-list information being information containing the main content identification information contained in the content delivery request and the selected sub content specification information, and the play-list information being information containing information indicating a sequence in which the main content identified by the main content identification information and the sub content specified by the selected sub content specification information are output, wherein the user equipment comprises a second receiver for receiving main content data and sub content data transmitted by the application server system and output, based on the received main content data and sub content data, viewing content in which sub content represented by the sub content data is inserted in main content represented by the main content data.

2. The content delivery system according to claim 1, wherein:

the user equipment comprises:

a third receiver for receiving the selected sub content specification information transmitted by the application server system; and a second transmitter for transmitting, to the application server system, a main content viewing request containing the main content identification information and an sub content viewing request containing the received selected sub content specification information when connection with the application server system is established by the one or more connection control servers, and the application server system comprises a fourth receiver for receiving the main content viewing request transmitted by the user equipment and transmitting main content data identified by the main content identification information contained in the received main content viewing request to the user equipment, and for receiving the sub content viewing request transmitted by the user equipment and transmitting sub content data specified by the selected sub content specification information contained in the received sub content viewing request to the user equipment.

3. The content delivery system according to claim 1, wherein:

the third receiver is configured to receive the play-list information transmitted by the application server system; and the second transmitter is configured to transmit the main content viewing request and the sub content viewing request to the application server system, based on the received play-list information.

4. The content delivery system according to claim 1, wherein:

the memory is configured to store the sub content data in association with attribute information representing an attribute of sub content represented by the sub content data;

the selection information contains user basic information that is information for specifying the attribute information and is information associated with user identification information for identifying a user of the user equipment; and the processor is configured to select sub content data stored in association with the attribute information specified by the user basic information associated with the user identification information for identifying the user of the user equipment which has transmitted the content delivery request.

5. The content delivery system according to claim 1, wherein:

the memory is configured to store the sub content data in association with attribute information representing an attribute of the sub content represented by the sub content data;

the selection information contains content basic information that is information for specifying the attribute information and is information associated with the main content identification information for identifying the main content; and the processor is configured to select sub content data stored in association with the attribute information specified by the content basic information associated with the main content identification information contained in the received content delivery request.

6. The content delivery system according to claim 1, wherein the one or more connection control servers is configured to establish the connection by exchanging a predetermined connection establishment message with each of the user equipment and the application server system; and the first transmitter is configured to transmit the selected sub content specification information to the user equipment via the one or more connection control servers by incorporating the selected sub content specification information in the connection establishment message.

7. The content delivery system according to claim 1, wherein:

the application server system comprises a service control server and a media server; and the service control server comprises the memory for storing sub content data, the first receiver for receiving the content delivery request, and the first transmitter for transmitting the selected sub content specification information.

8. The content delivery system according to claim 1, wherein:

the application server system comprises a service control server and a media server;

the service control server comprises the memory for storing sub content data;

the media server comprises the memory, the processor, and the first transmitter;

the service control server further comprises a third transmitter for transmitting the selection information to the media server via the one or more connection control servers;

the media server further comprises a fifth receiver for receiving the selection information transmitted by the service control server; and the processor is configured to select the sub content data based on the received selection information.

9. The content delivery system according to claim 1, wherein the sub content is advertisement content.

10. A content delivery system comprising an application server system and one or more connection control servers, the one or more connection control servers comprising a sixth receiver for receiving equipment specification information transmitted by user equipment and establishing connection between the application server system and the user equipment based on the received equipment specification information, the application server system comprising:
a fourth transmitter for transmitting content data representing content to the user equipment with which connection is established by the sixth receiver;
a controller for controlling a service provided by the fourth transmitter; and
a second memory for storing profile information of a user of the user equipment, the fourth transmitter comprising a memory for storing sub content data representing sub content and main content data representing main content, the controller comprising:
a first receiver for receiving a content delivery request containing main content identification information for identifying the main content and transmitted by the user equipment, via the sixth receiver; and
an processor for selecting the stored sub content data based on selection information containing attribute information representing an attribute of the sub content and preliminarily stored by the user profile server functions part, the controller or the one or more connection control servers; and
a first transmitter for transmitting selected sub content specification information for specifying the selected sub content data via the sixth receiver to the user equipment which has transmitted the content delivery request, wherein the first transmitter is configured to, at a same time that the one or more connection control servers executes a process for guaranteeing a communication bandwidth required for transmitting content data as a process for establishing the connection, transmit the play-list information via the sixth receiver to the user equipment which has transmitted the content delivery request, the play-list information being information containing the main content identification information contained in the content delivery request and the selected sub content specification information, and the play-list information being information containing information indicating a sequence in which the main content identified by the main content identification information and the sub content specified by the selected sub content specification information are output, wherein the user equipment comprises a second receiver for receiving main content data and sub content data transmitted by the application server system and outputting, based on the received main content data and sub content data, viewing content in which sub content represented by the sub content data is inserted in main content represented by the main content data.

11. The content delivery system according to claim 10, wherein:
the user equipment comprises:
a third receiver for receiving the selected sub content specification information transmitted by the controller; and
a second transmitter for transmitting, to the fourth transmitter, a main content viewing request containing the main content identification information and an sub content viewing request containing the received selected sub content specification information, when connection with the fourth transmitter is established by the sixth receiver, and
the fourth transmitter comprises a fourth receiver for receiving the main content viewing request transmitted by the user equipment and transmitting to the user equipment main content data identified by the main content identification information contained in the received main content viewing request, and for receiving the sub content viewing request transmitted by the user equipment and transmitting to the user equipment sub content data specified by the selected sub content specification information contained in the received sub content viewing request.

12. The content delivery system according to claim 10, wherein the user equipment comprises a second receiver for receiving main content data and sub content data transmitted by the fourth transmitter, and outputting, based on the received main content data and sub content data, viewing content in which sub content represented by the sub content data is inserted in main content represented by the main content data.

13. The content delivery system according to claim 10, wherein
the third receiver is configured to receive the play-list information transmitted by the controller; and
the second transmitter is configured to transmit the main content viewing request and the sub content viewing request to the fourth transmitter, based on the received play-list information.

14. A content delivery method comprising:
receiving equipment specification information transmitted by user equipment and establishing connection between an application server system and the user equipment based on the received equipment specification information, by one or more connection control servers;
receiving a content delivery request containing main content identification information for identifying main content and transmitted by the user equipment, by the application server system;
selecting sub content data stored in a storing device for storing sub content data representing sub content and main content data representing main content, based on selection information containing attribute information representing an attribute of sub content;
transmitting selected sub content specification information specifying the selected sub content data via the one or more connection control servers to the user equipment which has transmitted the content delivery request, by the application server system; and
at a same time that the one or more connection control servers executes a process for guaranteeing a communication bandwidth required for transmitting content data as a process for establishing the connection, transmitting the play-list information via the one or more connection control servers to the user equipment which has transmitted the content delivery request, the play-list information being information containing the main content identification information contained in the content delivery request and the selected sub content specification information, and the play-list information being information containing information indicating a sequence in which the main content identified by the main content identification information and the sub content specified by the selected sub content specification information are output, by the application server system, wherein the user equipment comprises a second receiver for receiving main content data and sub content data transmitted by the application server system and outputting, based on the received main content data and sub content data, viewing content in which sub content represented by the sub content data is inserted in main content represented by the main content data.

15. The content delivery method according to claim 14, comprising:

receiving the selected sub content specification information transmitted by the application server system, by the user equipment;

transmitting, to the application server system, a main content viewing request containing the main content identification information and an sub content viewing request containing the received selected sub content specification information, by the user equipment, when connection between the user equipment and the application server system is established by the one or more connection control servers; and receiving the main content viewing request transmitted by the user equipment and transmitting main content data identified by main content identification information contained in the received main content viewing request to the user equipment, and receiving the sub content viewing request transmitted by the user equipment and transmitting sub content data specified by selected sub content specification information contained in the received sub content viewing request to the user equipment, by the application server system.

16. The content delivery method according to claim 14, comprising:

receiving the main content data and the sub content data transmitted by the application server system, and outputting, based on the received main content data and sub content data, viewing content in which sub content represented by the sub content data is inserted in main content represented by the main content data, by the user equipment.

17. The content delivery method according to claim 14, comprising:

receiving the play-list information transmitted by the application server system, by the user equipment; and transmitting the main content viewing request and the sub content viewing request to the application server system based on the received play-list information, by the user equipment.

18. A service control server comprising:

a first receiver for receiving a content delivery request containing main content identification information for identifying main content and transmitted by a user equipment via a one or more connection control servers establishing connection between a media server and the user equipment;

an processor for selecting sub content data preliminarily stored in a storing device, based on selection information containing attribute information representing an attribute of sub content; and a first transmitter for transmitting selected sub content specification information specifying the selected sub content data via the one or more connection control servers to the user equipment which has transmitted the content delivery request, wherein the first transmitter is configured to, at a same time that the one or more connection control servers executes a process for guaranteeing a communication bandwidth required for transmitting content data as a process for establishing the connection, transmit the play-list information via the one or more connection control servers to the user equipment which has transmitted the content delivery request, the play-list information being information containing the main content identification information contained in the content delivery request and the selected sub content specification information, and the play-list information being information containing information indicating a sequence in which the main content identified by the main content identification information and the sub content specified by the selected sub content specification information are output, wherein the user equipment comprises a second receiver for receiving main content data and sub content data transmitted by the application server system and outputting, based on the received main content data and sub content data, viewing content in which sub content represented by the sub content data is inserted in main content represented by the main content data.

19. A user equipment comprising:

a third receiver for receiving selected sub content specification information selected based on selection information containing attribute information representing an attribute of sub content and which is information for specifying selected sub content data and transmitted by an application server system, via a one or more connection control servers establishing connection between the application server system and the user equipment, wherein the third receiver is configured to, at a same time that the one or more connection control servers executes a process for guaranteeing a communication bandwidth required for transmitting content data as a process for establishing the connection, receive the play-list information transmitted by the application server system, via the one or more connection control servers to the user equipment which has transmitted the content delivery request, wherein the play-list information being information containing the main content identification information contained in the content delivery request and the selected sub content specification information, and the play-list information being information containing information indicating a sequence in which the main content identified by the main content identification information and the sub content specified by the selected sub content specification information are output;

a second transmitter for transmitting, to the application server system, a main content viewing request containing main content identification information for identifying main content and an sub content viewing request containing the received selected sub content specification information when connection with the application server system is established by the one or more connection control servers, wherein the second transmitter is configured to transmit the main content viewing request and the sub content viewing request to the application server system, based on the received play-list information; and a second receiver for receiving main content data and sub content data transmitted by the application server system and outputting, based on the received main content data and sub content data, viewing content in which sub content represented by the sub content data is inserted in main content represented by the main content data.

20. A content delivery system comprising an application server system and one or more connection control servers, the one or more connection control servers being configured to receive equipment specification information transmitted by user equipment and establish connection between the application server system and this user equipment based on the received equipment specification information, the application server system comprising:
a memory for storing sub content data representing sub content and main content data representing main content;
a first receiver for receiving, a content delivery request transmitted by the user equipment and containing main content identification information for identifying the main content;
a processor for selecting the stored sub content data based on selection information containing attribute information representing an attribute of the sub content; and
a first transmitter for transmitting selected sub content specification information for specifying the selected sub content data via the one or more connection control servers to the user equipment which has transmitted the content delivery request, wherein the first transmitter is configured to, at a same time that the one or more connection control servers executes a process for guaranteeing a communication bandwidth required for transmitting content data as a process for establishing the connection, transmit the play-list information via the one or more connection control servers to the user equipment which has transmitted the content delivery request, play-list information being information containing the main content identification information contained in the content delivery request and the selected sub content specification information, and the play-list information being information containing information indicating a sequence in which the main content identified by the main content identification information and the sub content specified by the selected sub content specification information are output, wherein the user equipment comprises a second receiver for receiving main content data and sub content data transmitted by the application server system and outputting, based on the received main content data and sub content data, viewing content in which sub content represented by the sub content data is inserted in main content represented by the main content data.

21. A content delivery system comprising an application server system and one or more connection control servers, the one or more connection control servers comprising a sixth receiver for receiving equipment specification information transmitted by user equipment and establishing connection between the application server system and the user equipment based on the received equipment specification information, the application server system comprising:
a fourth transmitter for transmitting content data representing content to the user equipment with which the connection is established by the sixth receiver;
a controller for controlling a service provided by the fourth transmitter; and
a second memory for storing profile information of a user of the user equipment, the fourth transmitter comprising a memory for storing sub content data representing sub content and main content data representing main content, the controller comprising:
a first receiver for receiving a content delivery request containing main content identification information for identifying the main content and transmitted by the user equipment, via the sixth receiver; and
a processor for selecting the stored sub content data based on selection information containing attribute information representing an attribute of the sub content and preliminarily stored by the user profile server functions part, the controller or the one or more connection control servers; and
a first transmitter for transmitting selected sub content specification information for specifying the selected sub content data, via the sixth receiver to the user equipment which has transmitted the content delivery request, wherein the first transmitter is configured to, at a same time that the one or more connection control servers executes a process for guaranteeing a communication bandwidth required for transmitting content data as a process for establishing the connection, transmit the play-list information via the sixth receiver to the user equipment which has transmitted the content delivery request, play-list information being information containing the main content identification information contained in the content delivery request and the selected sub content specification information, and the play-list information being information containing information indicating a sequence in which the main content identified by the main content identification information and the sub content specified by the selected sub content specification information are output, wherein the user equipment comprises a second receiver for receiving main content data and sub content data transmitted by the application server system and outputting, based on the received main content data and sub content data, viewing content in which sub content represented by the sub content data is inserted in main content represented by the main content data.

22. A service control server comprising:
a first receiver for receiving a content delivery request containing main content identification information for identifying main content and transmitted by user equipment, via a one or more connection control servers establishing connection between a media server and the user equipment;
a processor for selecting sub content data preliminarily stored in a storing device based on selection information containing attribute information representing an attribute of sub content; and
a first transmitter for transmitting selected sub content specification information specifying the selected sub content data, via the one or more connection control servers to the user equipment which has transmitted the content delivery request, wherein the first transmitter is configured to, at a same time that the one or more connection control servers executes a process for guaranteeing a communication bandwidth required for transmitting content data as a process for establishing the connection, transmit the play-list information via the one or more connection control servers to the user equipment which has transmitted the content delivery request, the play-list information being information containing the main content identification information contained in the content delivery request and the selected sub content specification information, and the play-list information being information containing information indicating a sequence in which the main content identified by the main content identification information and the sub content specified by the selected sub content specification information are output, wherein the user equipment comprises a second receiver for receiving main content data and sub content data transmitted by the application server system and outputting, based on the received main content data and sub content data, viewing content in which sub content represented by the sub content data is inserted in main content represented by the main content data.

23. A user equipment comprising:
a third receiver for receiving selected sub content specification information selected based on selection information containing attribute information representing an attribute of sub content and which is information for specifying selected sub content data and transmitted by an application server system, via one or more connection control servers establishing connection between the application server system and the user equipment, wherein the third receiver is configured to, at a same time that the one or more connection control servers executes a process for guaranteeing a communication bandwidth required for transmitting content data as a process for establishing the connection, receive the play-list information transmitted by the application server system, via the one or more connection control servers to the user equipment which has transmitted the content delivery request, wherein the play-list information being information containing the main content identification information contained in the content delivery request and the selected sub content specification information, and the play-list information being information containing information indicating a sequence in which the main content identified by the main content identification information and the sub content specified by the selected sub content specification information are output;
a second transmitter for transmitting, to the application server system, a main content viewing request containing main content identification information for identifying main content and an sub content viewing request containing the received selected sub content specification information, when connection with the application server system is established by the one or more connection control servers, wherein the a second transmitter is configured to transmit the main content viewing request and the sub content viewing request to the application server system, based on the received play-list information; and
a second receiver for receiving main content data and sub content data transmitted by the application server system and outputting, based on the received main content data and sub content data, viewing content in which sub content represented by the sub content data is inserted in main content represented by the main content data.

24. A server comprising:
a memory; and
one or more processors, wherein the one or more processors are configured to:
store a plurality of sub content data and a plurality of main content data, wherein each of the plurality of sub content data is associated with one or more sub content attributes;
receive a content delivery request from a user device, wherein the content delivery request identifies first main content data of the plurality of main content data;
select at least first sub content data and second sub content data from the plurality of sub content data based on the first sub content data and the second sub content data being associated with at least a particular attribute of the sub content attributes;
transmit a first choice option corresponding to the first sub content data and a second choice option corresponding to the second sub content data to the user device; and
transmit play-list information to the user device via a connection established by one or more connection control servers at a same time that the one or more connection control servers executes a process for guaranteeing a communication bandwidth required for transmitting content data as a process to establish a connection, wherein the play-list information identifies the main content, the first sub content data, the second sub content data, and a sequence in which the main content, the first sub content data, the second sub content data are to be output,
wherein the user device comprises a second receiver for receiving main content data and sub content data transmitted by the application server system and outputting, based on the received main content data and sub content data, viewing content in which sub content represented by the sub content data is inserted in main content represented by the main content data.

25. The server according to claim 24, wherein the one or more processors are further configured to:
receive a sub content viewing request from the user device, wherein the sub content viewing request contains a selected choice corresponding to either the first choice option or the second choice option;
transmit the first sub content data to the user device as selected sub content data if the selected choice corresponds to the first choice option;
transmit the second sub content data to the user device as the selected sub content data if the selected choice corresponds to the second choice option; and
transmit the first main content data identified by the content delivery request to the user device.

26. The server according to claim 25, wherein a user inputs a selection command to the user device to select the first choice option or the second choice option as the selected choice.

27. The server according to claim 25, wherein one or more processors are further configured to:
transmit the first main content data and the selected sub content data to the user device for viewing on the user device.

28. The server according to claim 25, wherein the content delivery request from the user device contains user information about a user of the user device, and wherein the one or more processors are further configured to select the first sub content data and the second sub content data when the particular attribute corresponds to the user information.

29. The server according to claim 25, wherein the one or more processors are further configured to:
associate each of the plurality of main content data with one or more main content attributes;
select the first and second sub content data when the particular attribute corresponds to a particular main content attribute of the first main content.

30. The server according to claim 24, wherein the content delivery request from the user device contains user information about a user of the user device, and
wherein the one or more processors are further configured to select the first sub content data and the second sub content data when the particular attribute corresponds to the user information.

31. The server according to claim 24, wherein the one or more processors are further configured to:
associate each of the plurality of main content data with one or more main content attributes;
select the first and second sub content data when the particular attribute corresponds to a particular main content attribute of the first main content.

32. A content delivery system comprising an application server system and one or more connection control servers,
the one or more connection control servers being configured to receive user identification information transmitted by user equipment and establish connection between the application server system and this user equipment based on the received user identification information,
the application server system comprising:
a first receiver for receiving a content delivery request transmitted by the user equipment and containing main content identification information for identifying the main content, via the one or more connection control servers;
a processor for selecting the sub content data based on user basic information or the main content identification information, the user basic information being associated with the user identification information for identifying a user of the user equipment having transmitted the content delivery request, and the main content identification information being contained by the content delivery request; and
a first transmitter for transmitting selected sub content specification information for specifying the selected sub content data via the one or more connection control servers to the user equipment which has transmitted the content delivery request, wherein the first transmitter is configured to, at a same time that the one or more connection control servers executes a process for guaranteeing a communication bandwidth required for transmitting content data as a process for establishing the connection, transmit the play-list information via the one or more connection control servers to the user equipment which has transmitted the content delivery request, the play-list information being information containing the main content identification information contained in the content delivery request and the selected sub content specification information, and the play-list information being information containing information indicating a sequence in which the main content identified by the main content identification information and the sub content specified by the selected sub content specification information are output.

33. A content delivery system comprising an application server system and one or more connection control servers,
the one or more connection control servers comprising a sixth receiver for receiving user identification information transmitted by user equipment and establishing connection between the application server system and the user equipment based on the received user identification information,
the application server system comprising:
a fourth transmitter for transmitting content data representing content to the user equipment with which connection is established by the sixth receiver;
a controller for controlling a service provided by the fourth transmitter; and
a second memory for storing profile information of a user of the user equipment, and
the controller comprising:
a first receiver for receiving a content delivery request containing main content identification information for identifying the main content and transmitted by the user equipment, via the sixth receiver; and
a processor for selecting sub content data based on user basic information or the main content identification information, the user basic information being associated with the user identification information for identifying a user of the user equipment having transmitted the content delivery request, and the main content identification information being contained by the content delivery request; and
a first transmitter for transmitting selected sub content specification information for specifying the selected sub content data via the sixth receiver to the user equipment which has transmitted the content delivery request, wherein the first transmitter is configured to, at a same time that the one or more connection control servers executes a process for guaranteeing a communication bandwidth required for transmitting content data as a process for establishing the connection, transmit the play-list information via the sixth receiver to the user equipment which has transmitted the content delivery request, the play-list information being information containing the main content identification information contained in the content delivery request and the selected sub content specification information, and the play-list information being information containing information indicating a sequence in which the main content identified by the main content identification information and the sub content specified by the selected sub content specification information are output.

34. A content delivery method comprising:
receiving user identification information transmitted by user equipment and establishing connection between an application server system and the user equipment based on the received user identification information, by one or more connection control servers;
receiving a content delivery request containing main content identification information for identifying main content and transmitted by the user equipment, via the one or more connection control servers, by the application server system;
selecting sub content data representing sub content based on user basic information or the main content identification information, the user basic information being associated with the user identification information for identifying a user of the user equipment having transmitted the content delivery request, and the main content identification information being contained by the content delivery request; and at a same time that the one or more connection control servers executes a process for guaranteeing a communication bandwidth required for transmitting content data as a process for establishing the connection, transmitting the play-list information via the one or more connection control servers to the user equipment which has transmitted the content delivery request, the play-list information being information containing the main content identification information contained in the content delivery request and selected sub content specification information specifying the selected sub content data, and the play-list information being information containing information indicating a sequence in which the main content identified by the main content identification information and the sub content specified by the selected sub content specification information are output, by the application server system.

35. A non-transitory computer-readable medium storing a program comprising instructions for causing a service control server to realize:

a first receiver for receiving a content delivery request containing main content identification information for identifying main content and transmitted by a user equipment via one or more connection control servers establishing connection between a media server and the user equipment;

a processor for selecting sub content data based on content basic information associated with the main content identification information contained by the content delivery request; and a first transmitter for transmitting selected sub content specification information specifying the selected sub content data via the one or more connection control servers to the user equipment which has transmitted the content delivery request, wherein the first transmitter for, at a same time that the one or more connection control servers executes a process for guaranteeing a communication bandwidth required for transmitting content data as a process for establishing the connection, transmitting the play-list information via the one or more connection control servers to the user equipment which has transmitted the content delivery request, the play-list information being information containing the main content identification information contained in the content delivery request and the selected sub content specification information, and the play-list information being information containing information indicating a sequence in which the main content identified by the main content identification information and the sub content specified by the selected sub content specification information are output.

36. A service control server comprising:

a first receiver for receiving a content delivery request containing main content identification information for identifying main content and transmitted by a user equipment via one or more connection control servers establishing connection between a media server and the user equipment;

a processor for selecting sub content data based on content basic information associated with the main content identification information contained by the content delivery request; and a first transmitter for transmitting selected sub content specification information specifying the selected sub content data via the one or more connection control servers to the user equipment which has transmitted the content delivery request, wherein the first transmitter is configured to, at a same time that the one or more connection control servers executes a process for guaranteeing a communication bandwidth required for transmitting content data as a process for establishing the connection, transmit the play-list information via the one or more connection control servers to the user equipment which has transmitted the content delivery request, the play-list information being information containing the main content identification information contained in the content delivery request and the selected sub content specification information, and the play-list information being information containing information indicating a sequence in which the main content identified by the main content identification information and the sub content specified by the selected sub content specification information are output.

* * * * *

(12) INTER PARTES REVIEW CERTIFICATE (4072nd)
United States Patent
Taniguchi et al.

(10) Number: US 9,769,427 K1
(45) Certificate Issued: Jul. 25, 2025

(54) CONTENT DELIVERY SYSTEM

(75) Inventors: Kunihiro Taniguchi; Kazushige Ishikawa; Kazuo Asami

(73) Assignee: NEC CORPORATION

Trial Numbers:

IPR2023-01240 filed Jul. 27, 2023
IPR2023-01241 filed Jul. 27, 2023

Inter Partes Review Certificate for:

Patent No.: 9,769,427
Issued: Sep. 19, 2017
Appl. No.: 13/129,756
Filed: May 17, 2011

The results of IPR2023-01240; IPR2023-01241 are reflected in this inter partes review certificate under 35 U.S.C. 318(b).

INTER PARTES REVIEW CERTIFICATE
U.S. Patent 9,769,427 K1
Trial No. IPR2023-01240
Certificate Issued Jul. 25, 2025

AS A RESULT OF THE INTER PARTES REVIEW PROCEEDING, IT HAS BEEN DETERMINED THAT:

Claims 1-23 and 32-36 are cancelled.

* * * * *